(12) United States Patent
Takahashi et al.

(10) Patent No.: US 12,289,726 B2
(45) Date of Patent: Apr. 29, 2025

(54) TERMINAL AND COMMUNICATION METHOD

(71) Applicant: NTT DOCOMO, INC., Tokyo (JP)

(72) Inventors: Hideaki Takahashi, Tokyo (JP); Yuki Matsumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 371 days.

(21) Appl. No.: 17/633,877

(22) PCT Filed: Aug. 14, 2019

(86) PCT No.: PCT/JP2019/031989
§ 371 (c)(1),
(2) Date: Feb. 8, 2022

(87) PCT Pub. No.: WO2021/029052
PCT Pub. Date: Feb. 18, 2021

(65) Prior Publication Data
US 2022/0330230 A1    Oct. 13, 2022

(51) Int. Cl.
*H04W 72/21* (2023.01)
*H04L 5/00* (2006.01)

(52) U.S. Cl.
CPC ........... *H04W 72/21* (2023.01); *H04L 5/0053* (2013.01)

(58) Field of Classification Search
CPC .... H04W 72/21; H04L 5/0053; H04L 5/0094; H04L 5/0023
See application file for complete search history.

(56) References Cited

U.S. PATENT DOCUMENTS

| | | | |
|---|---|---|---|
| 2019/0254110 A1* | 8/2019 | He | H04L 5/0048 |
| 2019/0296805 A1* | 9/2019 | Son | H04W 76/27 |
| 2020/0053721 A1* | 2/2020 | Cheng | H04B 7/0408 |
| 2020/0267712 A1* | 8/2020 | Cirik | H04W 72/23 |
| 2020/0305168 A1* | 9/2020 | Liou | H04W 76/11 |
| 2020/0314829 A1* | 10/2020 | Venugopal | H04W 72/23 |
| 2020/0351069 A1* | 11/2020 | Grant | H04L 5/0098 |
| 2021/0153209 A1* | 5/2021 | Guan | H04L 5/0023 |
| 2021/0392673 A1* | 12/2021 | Miao | H04W 72/1268 |
| 2022/0022237 A1* | 1/2022 | Kim | H04L 5/0053 |
| 2022/0077969 A1* | 3/2022 | Kim | H04L 1/1861 |
| 2022/0150926 A1* | 5/2022 | Mondal | H04W 72/1268 |
| 2022/0166468 A1* | 5/2022 | Go | H04B 7/0456 |

(Continued)

OTHER PUBLICATIONS

Office Action issued in counterpart Chinese Patent Application No. 201980099133.X mailed on Jun. 8, 2023 (20 pages).

(Continued)

*Primary Examiner* — Redentor Pasia
(74) *Attorney, Agent, or Firm* — Osha Bergman Watanabe & Burton LLP

(57) ABSTRACT

A terminal includes a reception unit configured to receive resource information of an uplink transmission, the resource information including spatial relation information, and a setting unit configured to perform configuration related to the uplink transmission, in accordance with the resource information of the uplink transmission, the resource information including the spatial relation information. The spatial relation information of the resource information of the uplink transmission is activated or deactivated.

4 Claims, 45 Drawing Sheets

(56) References Cited

U.S. PATENT DOCUMENTS

2023/0300946 A1* 9/2023 Zhang .................. H04B 7/0695
                                                    370/329

OTHER PUBLICATIONS

LG Electronics; "Updated feature lead summary of Enhancements on Multi-beam Operations"; 3GPP TSG RAN WG1 Meeting #96bis, R1-1905838; Xi'an, China; Apr. 8-12, 2019 (24 pages).

LG Electronics; "Feature lead summary of Enhancements on Multi-beam Operations"; 3GPP TSG RAN WG1 Meeting #96, R1-1903244; Athens, Greece; Feb. 25-Mar. 1, 2019 (23 pages).

LG Electronics; "Feature lead summary of Enhancements on Multi-beam Operations"; 3GPP TSG RAN WG1 Meeting #96bis, R1-1905712; Xi'an, China; Apr. 8-12, 2019 (23 pages).

International Search Report issued in PCT/JP2019/031989 on Mar. 17, 2020 (5 pages).

Written Opinion of the International Searching Authority issued in PCT/JP2019/031989 on Mar. 17, 2020 (3 pages).

NTT DOCOMO, Inc.; "Enhancements on multi-TRP/panel transmission"; 3GPP TSG RAN WG1 #97, R1-1906224; Reno, USA; May 13-17, 2019 (32 pages).

CMCC; "Enhancements on multi-beam operation"; 3GPP TSG RAN WG1 #97, R1-1906522; Reno, USA; May 13-17, 2019 (7 pages).

3GPP TS 38.214 V15.6.0; "3rd Generation Partnership Project; Technical Specification Group Radio Access Network; NR; Physical layer procedures for data (Release 15)"; Jun. 2019 (105 pages).

3GPP TS 38.331 V15.6.0; "3rd Generation Partnership Project; Technical Specification Group Radio Access Network; NR; Radio Resource Control (RRC) protocol specification (Release 15)"; Jun. 2019 (519 pages).

3GPP TS 38.321 V15.6.0; "3rd Generation Partnership Project; Technical Specification Group Radio Access Network; NR; Medium Access Control (MAC) protocol specification (Release 15)"; Jun. 2019 (78 pages).

Office Action issued in the counterpart Japanese Patent Application No. 2021-539778, mailed on Feb. 14, 2023 (3 pages).

NTT DOCOMO, Inc.; "Discussion on multi-beam enhancement"; 3GPP TSG RAN WG1 #97, R1-1906225; Reno, USA; May 13-17, 2019 (24 pages).

Office Action issued in the counterpart Chinese Patent Application No. 201980099133.X, mailed on Nov. 1, 2023 (15 pages).

Office Action issued in the counterpart Chinese Patent Application No. 201980099133.X, mailed on Apr. 25, 2024 (18 pages).

* cited by examiner

PUCCH-Config

The IE *PUCCH-Config* is used to configure UE specific PUCCH parameters (per BWP).

PUCCH-Config information element

```
-- ASN1START
-- TAG-PUCCH-CONFIG-START

PUCCH-Config ::=                       SEQUENCE {
    resourceSetToAddModList                SEQUENCE (SIZE (1..maxNrofPUCCH-ResourceSets)) OF PUCCH-ResourceSet        OPTIONAL,   -- Need N
    resourceSetToReleaseList               SEQUENCE (SIZE (1..maxNrofPUCCH-ResourceSets)) OF PUCCH-ResourceSetId      OPTIONAL,   -- Need N
    resourceToAddModList                   SEQUENCE (SIZE (1..maxNrofPUCCH-Resources)) OF PUCCH-Resource              OPTIONAL,   -- Need N
    resourceToReleaseList                  SEQUENCE (SIZE (1..maxNrofPUCCH-Resources)) OF PUCCH-ResourceId            OPTIONAL,   -- Need M
    format1                                SetupRelease { PUCCH-FormatConfig }                                        OPTIONAL,   -- Need M
    format2                                SetupRelease { PUCCH-FormatConfig }                                        OPTIONAL,   -- Need M
    format3                                SetupRelease { PUCCH-FormatConfig }                                        OPTIONAL,   -- Need M
    format4                                SetupRelease { PUCCH-FormatConfig }                                        OPTIONAL,   -- Need M schedulingRequestResourceToAddModList  SEQUENCE (SIZE (1..maxNrofSR-Resources)) OF SchedulingRequestResourceConfig
                                                                                                                      OPTIONAL,   -- Need N
    schedulingRequestResourceToReleaseList SEQUENCE (SIZE (1..maxNrofSR-Resources)) OF SchedulingRequestResourceId    OPTIONAL,   -- Need N multi-CSI-PUCCH-ResourceList           SEQUENCE (SIZE (1..2)) OF PUCCH-ResourceId                                 OPTIONAL,   -- Need M
    dl-DataToUL-ACK                        SEQUENCE (SIZE (1..8)) OF INTEGER (0..15)                                  OPTIONAL,   -- Need M spatialRelationInfoToAddModList        SEQUENCE (SIZE (1..maxNrofSpatialRelationInfos)) OF PUCCH-SpatialRelationInfo
                                                                                                                      OPTIONAL,   -- Need N
    spatialRelationInfoToReleaseList       SEQUENCE (SIZE (1..maxNrofSpatialRelationInfos)) OF PUCCH-SpatialRelationInfoId
                                                                                                                      OPTIONAL,   -- Need N
    pucch-PowerControl                     PUCCH-PowerControl                                                         OPTIONAL,   -- Need M
    ...,
    [[
    resourceSetToAddModList-v16xy          SEQUENCE (SIZE (1..maxNrofPUCCH-ResourceSets)) OF PUCCH-ResourceSet-v16xy OPTIONAL,   -- Need N
    spatialRelationInfoToAddModListExt-r16 SEQUENCE (SIZE (1..maxNrofSpatialRelationInfos-r16)) OF PUCCH-SpatialRelationInfoExt-r16
                                                                                                                      OPTIONAL,   -- Need N
    spatialRelationInfoToReleaseListExt-r16 SEQUENCE (SIZE (1..maxNrofSpatialRelationInfos-r16)) OF PUCCH-SpatialRelationInfoId-r16
                                                                                                                      OPTIONAL    -- Need N
    ]]
}

PUCCH-FormatConfig ::=                 SEQUENCE {
    interslotFrequencyHopping              ENUMERATED {enabled}                                                       OPTIONAL,   -- Need R
    additionalDMRS                         ENUMERATED {true}                                                          OPTIONAL,   -- Need R
    maxCodeRate                            PUCCH-MaxCodeRate                                                          OPTIONAL,   -- Need R
    nrofSlots                              ENUMERATED {n2,n4,n8}                                                      OPTIONAL,   -- Need S
    pi2BPSK                                ENUMERATED {enabled}                                                       OPTIONAL,   -- Need R
    simultaneousHARQ-ACK-CSI               ENUMERATED {true}                                                          OPTIONAL    -- Need R
}
```

```
PUCCH-MaxCodeRate ::=              ENUMERATED {zeroDot08, zeroDot15, zeroDot25, zeroDot35, zeroDot45, zeroDot60, zeroDot80}

-- A set with one or more PUCCH resources
PUCCH-ResourceSet ::=              SEQUENCE {
    pucch-ResourceSetId                PUCCH-ResourceSetId,
    resourceList                       SEQUENCE (SIZE (1..maxNrofPUCCH-ResourcesPerSet)) OF PUCCH-ResourceId,
    maxPayloadMinus1                   INTEGER (4..256)                                                             OPTIONAL       -- Need R
}

PUCCH-ResourceSet-v16xy ::=        SEQUENCE {
    pucch-ResourceGroupList-r16        SEQUENCE (SIZE (1..maxNrofPUCCH-ResourcesPerSet)) OF PUCCH-ResourceGroupId-r16
}

PUCCH-ResourceGroupId-r16 ::=      INTEGER (0..maxNrofPUCCH-ResourceGroup-1)

PUCCH-ResourceSetId ::=            INTEGER (0..maxNrofPUCCH-ResourceSets-1)

PUCCH-Resource ::=                 SEQUENCE {
    pucch-ResourceId                   PUCCH-ResourceId,
    startingPRB                        PRB-Id,
    intraSlotFrequencyHopping          ENUMERATED { enabled }                                                        OPTIONAL,      -- Need R
    secondHopPRB                       PRB-Id                                                                        OPTIONAL,      -- Need R
    format                             CHOICE {
        format0                            PUCCH-format0,
        format1                            PUCCH-format1,
        format2                            PUCCH-format2,
        format3                            PUCCH-format3,
        format4                            PUCCH-format4
    }
}

PUCCH-ResourceId ::=               INTEGER (0..maxNrofPUCCH-Resources-1)

PUCCH-format0 ::=                  SEQUENCE {
    initialCyclicShift                 INTEGER(0..11),
    nrofSymbols                        INTEGER (1..2),
    startingSymbolIndex                INTEGER(0..13)
}

PUCCH-format1 ::=                  SEQUENCE {
    initialCyclicShift                 INTEGER(0..11),
    nrofSymbols                        INTEGER (4..14),
    startingSymbolIndex                INTEGER(0..10),
    timeDomainOCC                      INTEGER(0..6)
}
```

FIG.3C

```
PUCCH-format2 ::=           SEQUENCE {
    nrofPRBs                    INTEGER (1..16),
    nrofSymbols                 INTEGER (1..2),
    startingSymbolIndex         INTEGER (0..13)
}

PUCCH-format3 ::=           SEQUENCE {
    nrofPRBs                    INTEGER (1..16),
    nrofSymbols                 INTEGER (4..14),
    startingSymbolIndex         INTEGER (0..10)
}

PUCCH-format4 ::=           SEQUENCE {
    nrofSymbols                 INTEGER (4..14),
    occ-Length                  ENUMERATED {n2,n4},
    occ-Index                   ENUMERATED {n0,n1,n2,n3},
    startingSymbolIndex         INTEGER (0..10)
}

-- TAG-PUCCH-CONFIG-STOP
-- ASN1STOP
```

| PUCCH-Config field descriptions |
|---|
| dl-DataToUL-ACK |
| List of timing for given PDSCH to the DL ACK (see TS 38.213 [13], clause 9.1.2). |
| format1 |
| Parameters that are common for all PUCCH resources of format 1. |
| format2 |
| Parameters that are common for all PUCCH resources of format 2. |
| format3 |
| Parameters that are common for all PUCCH resources of format 3. |
| format4. |
| Parameters that are common for all PUCCH resources of format 4 |
| resourceSetToAddModList, resourceSetToReleaseList |
| Lists for adding and releasing PUCCH resource sets (see TS 38.213 [13], clause 9.2). If the network includes *resourceSetToAddModList-v16xy*, it includes the same number of entries, and listed in the same order, as in *resourceSetToAddModList* (i.e. without suffix). |
| resourceToAddModList, resourceToReleaseList |
| Lists for adding and releasing PUCCH resources applicable for the UL BWP and serving cell in which the *PUCCH-Config* is defined. The resources defined herein are referred to from other parts of the configuration to determine which resource the UE shall use for which report. |
| spatialRelationInfoToAddModList |
| Configuration of the spatial relation between a reference RS and PUCCH. Reference RS can be SSB/CSI-RS/SRS. If the list has more than one element, MAC-CE selects a single element (see TS 38.321 [3], clause 5.18.8 and TS 38.213 [13], clause 9.2.2). |

FIG. 3D

| PUCCH-format3 field descriptions |
|---|
| *nrofPRBs*<br>The supported values are 1,2,3,4,5,6,8,9,10,12,15 and 16. |

| PUCCH-FormatConfig field descriptions |
|---|
| *additionalDMRS*<br>If the field is present, the UE enables 2 DMRS symbols per hop of a PUCCH Format 3 or 4 if both hops are more than X symbols when FH is enabled (X=4). And it enables 4 DMRS symbols for a PUCCH Format 3 or 4 with more than 2X+1 symbols when FH is disabled (X=4). The field is not applicable for format 1 and 2. See TS 38.213 [13], clause 9.2.2. |
| *interslotFrequencyHopping*<br>If the field is present, the UE enables inter-slot frequency hopping when PUCCH Format 1, 3 or 4 is repeated over multiple slots. For long PUCCH over multiple slots, the intra and inter slot frequency hopping cannot be enabled at the same time for a UE. The field is not applicable for format 2. See TS 38.213 [13], clause 9.2.6. |
| *maxCodeRate*<br>Max coding rate to determine how to feedback UCI on PUCCH for format 2, 3 or 4. The field is not applicable for format 1. See TS 38.213 [13], clause 9.2.5. |
| *nrofSlots*<br>Number of slots with the same PUCCH F1, F3 or F4. When the field is absent the UE applies the value *n1*. The field is not applicable for format 2. See TS 38.213 [13], clause 9.2.6. |
| *pi2BPSK*<br>If the field is present, the UE uses pi/2 BPSK for UCI symbols instead of QPSK for PUCCH. The field is not applicable for format 1 and 2. See TS 38.213 [13], clause 9.2.5. |
| *simultaneousHARQ-ACK-CSI*<br>If the field is present, the UE uses simultaneous transmission of CSI and HARQ-ACK feedback with or without SR with PUCCH Format 2, 3 or 4. See TS 38.213 [13], clause 9.2.5. When the field is absent the UE applies the value *off*. The field is not applicable for format 1. |

| PUCCH-Resource field descriptions |
|---|
| *format*<br>Selection of the PUCCH format (format 0 – 4) and format-specific parameters, see TS 38.213 [13], clause 9.2. *format0* and *format1* are only allowed for a resource in a first PUCCH resource set. *format2*, *format3* and *format4* are only allowed for a resource in non-first PUCCH resource set. |
| *intraSlotFrequencyHopping*<br>Enabling intra-slot frequency hopping, applicable for all types of PUCCH formats. For long PUCCH over multiple slots, the intra and inter slot frequency hopping cannot be enabled at the same time for a UE. See TS 38.213 [13], clause 9.2.1. |
| *pucch-ResourceId*<br>Identifier of the PUCCH resource. |
| *secondHopPRB*<br>Index of first PRB after frequency hopping (for second hop) of PUCCH. This value is applicable for intra-slot frequency hopping. See TS 38.213 [13], clause 9.2.1. |

FIG.3E

| PUCCH-ResourceSet field descriptions |
|---|
| *pucch-ResourceGroupList* <br> List of PUCCH resource group IDs to which each PUCCH resource used for this PUCCH resource set belongs. The first entry of this list is the PUCCH resource group ID to which the first entry of the PUCCH resource in *resourceList* belongs. The second entry of this list is the PUCCH resource group ID to which the second entry of the PUCCH resource in *resourceList* belongs. Thus, the number of entries in *pucch-ResourceGroupList* shall be the same as the one in *resourceList*. |
| *maxPayloadMinus1* <br> Maximum number of payload bits minus 1 that the UE may transmit using this PUCCH resource set. In a PUCCH occurrence, the UE chooses the first of its *PUCCH-ResourceSet* which supports the number of bits that the UE wants to transmit. The field is absent in the first set (Set0) since the maximum Size of Set0 is specified to be 3 bits. The field is absent in the last configured set since the UE derives its maximum payload size as specified in TS 38.213 [13]. This field can take integer values that are multiples of 4 (see TS 38.213 [13], clause 9.2). |
| *resourceList* <br> PUCCH resources of *format0* and *format1* are only allowed in the first PUCCH resource set, i.e., in a PUCCH-ResourceSet with *pucch-ResourceSetId* = 0. This set may contain between 1 and 32 resources. PUCCH resources of *format2*, *format3* and *format4* are only allowed in a PUCCH-ResourceSet with *pucch-ResourceSetId* > 0. If present, these sets contain between 1 and 8 resources each. The UE chooses a PUCCH-Resource from this list as specified in TS 38.213 [13], clause 9.2.3. Note that this list contains only a list of resource IDs. The actual resources are configured in *PUCCH-Config*. |

FIG.3F

PUCCH-SpatialRelationInfo

The IE *PUCCH-SpatialRelationInfo* is used to configure the spatial setting for PUCCH transmission and the parameters for PUCCH power control, see TS 38.213, [13], clause 9.2.2.

*PUCCH-SpatialRelationInfo information element*

```
-- ASN1START
-- TAG-PUCCH-SPATIALRELATIONINFO-START

PUCCH-SpatialRelationInfo ::=       SEQUENCE {
    pucch-SpatialRelationInfoId         PUCCH-SpatialRelationInfoId,
    servingCellId                       ServCellIndex                                       OPTIONAL,    -- Need S
    referenceSignal                     CHOICE {
        ssb-Index                           SSB-Index,
        csi-RS-Index                        NZP-CSI-RS-ResourceId,
        srs                                 SEQUENCE {
                                                resource            SRS-ResourceId,
                                                uplinkBWP           BWP-Id
                                            }
    },
    pucch-PathlossReferenceRS-Id        PUCCH-PathlossReferenceRS-Id,
    p0-PUCCH-Id                         P0-PUCCH-Id,
    closedLoopIndex                     ENUMERATED { i0, i1 }
}

PUCCH-SpatialRelationInfoExt-r16 ::= SEQUENCE {
    pucch-SpatialRelationInfoId-r16     PUCCH-SpatialRelationInfoId,
    servingCellId-r16                   ServCellIndex                                       OPTIONAL,    -- Need S
    referenceSignal-r16                 CHOICE {
        ssb-Index-r16                       SSB-Index,
        csi-RS-Index-r16                    NZP-CSI-RS-ResourceId,
        srs-r16                             SEQUENCE {
                                                resource-r16        SRS-ResourceId,
                                                uplinkBWP-r16       BWP-Id
                                            }
    },
    pucch-PathlossReferenceRS-Id-r16    PUCCH-PathlossReferenceRS-Id,
    p0-PUCCH-Id-r16                     P0-PUCCH-Id,
    closedLoopIndex-r16                 ENUMERATED { i0, i1 }
}

PUCCH-SpatialRelationInfoId ::=         INTEGER (1..maxNrofSpatialRelationInfos)
PUCCH-SpatialRelationInfoId-r16 ::=     INTEGER (1..maxNrofSpatialRelationInfos-r16)

-- TAG-PUCCH-SPATIALRELATIONINFO-STOP
-- ASN1STOP
```

FIG.3H

6.4 RRC multiplicity and type constraint values

— Multiplicity and type constraint definitions

```
-- ASN1START
-- TAG-MULTIPLICITY-AND-TYPE-CONSTRAINT-DEFINITIONS-START maxBandComb                        INTEGER ::= 65536   -- Maximum number of DL band combinations
maxCellBlack                       INTEGER ::= 16      -- Maximum number of NR blacklisted cell ranges in SIB3, SIB4
maxCellInter                       INTEGER ::= 16      -- Maximum number of inter-Freq cells listed in SIB4

(MIDDLE PARTS OMITTED)

maxNrofSpatialRelationInfos        INTEGER ::= 8
maxNrofSpatialRelationInfos-r16    INTEGER ::= 64      -- Maximum number of spatial relation information pwer BWP in a cell
maxNrofIndexesToReport             INTEGER ::= 32
maxNrofIndexesToReport2            INTEGER ::= 64
maxNrofSSBs-1                      INTEGER ::= 63      -- Maximum number of SSB resources in a resource set minus 1.
maxNrofS-NSSAI                     INTEGER ::= 8       -- Maximum number of S-NSSAI.
maxNrofTCI-StatesPDCCH             INTEGER ::= 64
maxNrofTCI-States                  INTEGER ::= 128     -- Maximum number of TCI states.
maxNrofTCI-States-1                INTEGER ::= 127     -- Maximum number of TCI states minus 1.
maxNrofUL-Allocations              INTEGER ::= 16      -- Maximum number of PUSCH time domain resource allocations.

(MIDDLE PARTS OMITTED)

maxEUTRA-UL-FeatureSets            INTEGER ::= 256     -- (for E-UTRA) Total number of FeatureSets (size of the pool)
maxFeatureSetsPerBand              INTEGER ::= 128     -- (for NR) The number of feature sets associated with one band.
maxPerCC-FeatureSets               INTEGER ::= 1024    -- (for NR) Total number of CC-specific FeatureSets (size of the pool)
maxFeatureSetCombinations          INTEGER ::= 1024    -- (for MR-DC/NR)Total number of Feature set combinations (size of the
                                                       -- pool)

maxInterRAT-RSTD-Freq              INTEGER ::= 3 maxNrofPUCCH-ResourceGroup-1       INTEGER ::= 127     -- Maximum number of PUCCH resource groups minus 1

-- TAG-MULTIPLICITY-AND-TYPE-CONSTRAINT-DEFINITIONS-STOP
-- ASN1STOP
```

FIG.4A

PUCCH-Config

The IE *PUCCH-Config* is used to configure UE specific PUCCH parameters (per BWP).

PUCCH-Config information element

```
-- ASN1START
-- TAG-PUCCH-CONFIG-START

PUCCH-Config ::=                        SEQUENCE {
    resourceSetToAddModList             SEQUENCE (SIZE (1..maxNrofPUCCH-ResourceSets)) OF PUCCH-ResourceSet    OPTIONAL,   -- Need N
    resourceSetToReleaseList            SEQUENCE (SIZE (1..maxNrofPUCCH-ResourceSets)) OF PUCCH-ResourceSetId  OPTIONAL,   -- Need N
    resourceToAddModList                SEQUENCE (SIZE (1..maxNrofPUCCH-Resources))    OF PUCCH-Resource       OPTIONAL,   -- Need N
    resourceToReleaseList               SEQUENCE (SIZE (1..maxNrofPUCCH-Resources))    OF PUCCH-ResourceId     OPTIONAL,   -- Need N
    format1                             SetupRelease { PUCCH-FormatConfig }                                    OPTIONAL,   -- Need M
    format2                             SetupRelease { PUCCH-FormatConfig }                                    OPTIONAL,   -- Need M
    format3                             SetupRelease { PUCCH-FormatConfig }                                    OPTIONAL,   -- Need M
    format4                             SetupRelease { PUCCH-FormatConfig }                                    OPTIONAL,   -- Need M schedulingRequestResourceToAddModList      SEQUENCE (SIZE (1..maxNrofSR-Resources)) OF SchedulingRequestResourceConfig
                                                                                                               OPTIONAL,   -- Need N
    schedulingRequestResourceToReleaseList     SEQUENCE (SIZE (1..maxNrofSR-Resources)) OF SchedulingRequestResourceId
                                                                                                               OPTIONAL,   -- Need N
    multi-CSI-PUCCH-ResourceList        SEQUENCE (SIZE (1..2)) OF PUCCH-ResourceId                             OPTIONAL,   -- Need M
    dl-DataToUL-ACK                     SEQUENCE (SIZE (1..8)) OF INTEGER (0..15)                              OPTIONAL,   -- Need M spatialRelationInfoToAddModList     SEQUENCE (SIZE (1..maxNrofSpatialRelationInfos)) OF PUCCH-SpatialRelationInfo
                                                                                                               OPTIONAL,   -- Need N
    spatialRelationInfoToReleaseList    SEQUENCE (SIZE (1..maxNrofSpatialRelationInfos)) OF PUCCH-SpatialRelationInfoId
                                                                                                               OPTIONAL,   -- Need N
    pucch-PowerControl                  PUCCH-PowerControl                                                     OPTIONAL,   -- Need M
    ...,
    resourceToAddModList-v16xy          SEQUENCE (SIZE (1..maxNrofPUCCH-Resources))  OF PUCCH-Resource-v16xy   OPTIONAL    -- Need N
    spatialRelationInfoToAddModListExt-r16  SEQUENCE (SIZE (1..maxNrofSpatialRelationInfos-r16))  OF PUCCH-SpatialRelationInfoExt-r16
                                                                                                               OPTIONAL    -- Need N
    spatialRelationInfoToReleaseListExt-r16 SEQUENCE (SIZE (1..maxNrofSpatialRelationInfos-r16))  OF PUCCH-SpatialRelationInfoId-r16
                                                                                                               OPTIONAL    -- Need N

]}

PUCCH-FormatConfig ::=                  SEQUENCE {
    interslotFrequencyHopping           ENUMERATED {enabled}                                                   OPTIONAL,   -- Need R
    additionalDMRS                      ENUMERATED {true}                                                      OPTIONAL,   -- Need R
    maxCodeRate                         PUCCH-MaxCodeRate                                                      OPTIONAL,   -- Need R
    nrofSlots                           ENUMERATED {n2,n4,n8}                                                  OPTIONAL,   -- Need S
    pi2BPSK                             ENUMERATED {enabled}                                                   OPTIONAL,   -- Need R
    simultaneousHARQ-ACK-CSI            ENUMERATED {true}                                                      OPTIONAL    -- Need R
}
```

FIG.4B

```
}
PUCCH-MaxCodeRate ::=              ENUMERATED {zeroDot08, zeroDot15, zeroDot25, zeroDot35, zeroDot45, zeroDot60, zeroDot80}

-- A set with one or more PUCCH resources
PUCCH-ResourceSet ::=      SEQUENCE {
    pucch-ResourceSetId            PUCCH-ResourceSetId,
    resourceList                   SEQUENCE (SIZE (1..maxNrofPUCCH-ResourcesPerSet)) OF PUCCH-ResourceId,
    maxPayloadMinus1               INTEGER (4..256)                                                         OPTIONAL,   -- Need R
}

PUCCH-ResourceSetId ::=    INTEGER (0..maxNrofPUCCH-ResourceSets-1)

PUCCH-Resource ::=         SEQUENCE {
    pucch-ResourceId               PUCCH-ResourceId,
    startingPRB                    PRB-Id,
    intraSlotFrequencyHopping      ENUMERATED { enabled }                                                   OPTIONAL,   -- Need R
    secondHopPRB                   PRB-Id                                                                   OPTIONAL,   -- Need R
    format                         CHOICE {
        format0                        PUCCH-format0,
        format1                        PUCCH-format1,
        format2                        PUCCH-format2,
        format3                        PUCCH-format3,
        format4                        PUCCH-format4
    }
}

PUCCH-Resource-v16xy ::=           SEQUENCE {
    pucch-ResourceGroupId-r16          PUCCH-ResourceGroupId-r16
}

PUCCH-ResourceGroupId-r16 ::=      INTEGER (0..maxNrofPUCCH-ResourceGroup-1)

PUCCH-ResourceId ::=       INTEGER (0..maxNrofPUCCH-Resources-1)
```

FIG.4C

```
PUCCH-format0 ::=           SEQUENCE {
    initialCyclicShift          INTEGER(0..11),
    nrofSymbols                 INTEGER (1..2),
    startingSymbolIndex         INTEGER(0..13)
}

PUCCH-format1 ::=           SEQUENCE {
    initialCyclicShift          INTEGER(0..11),
    nrofSymbols                 INTEGER (4..14),
    startingSymbolIndex         INTEGER(0..10),
    timeDomainOCC               INTEGER(0..6)
}

PUCCH-format2 ::=           SEQUENCE {
    nrofPRBs                    INTEGER (1..16),
    nrofSymbols                 INTEGER (1..2),
    startingSymbolIndex         INTEGER(0..13)
}

PUCCH-format3 ::=           SEQUENCE {
    nrofPRBs                    INTEGER (1..16),
    nrofSymbols                 INTEGER (4..14),
    startingSymbolIndex         INTEGER(0..10)
}

PUCCH-format4 ::=           SEQUENCE {
    nrofSymbols                 INTEGER (4..14),
    occ-Length                  ENUMERATED {n2,n4},
    occ-Index                   ENUMERATED {n0,n1,n2,n3},
    startingSymbolIndex         INTEGER(0..10)
}

-- TAG-PUCCH-CONFIG-STOP
-- ASN1STOP
```

FIG.4D

| PUCCH-Config field descriptions |
|---|
| dl-DataToUL-ACK <br> List of timing for given PDSCH to the DL ACK (see TS 38.213 [13], clause 9.1.2). |
| format1 <br> Parameters that are common for all PUCCH resources of format 1. |
| format2 <br> Parameters that are common for all PUCCH resources of format 2. |
| format3 <br> Parameters that are common for all PUCCH resources of format 3. |
| format4 <br> Parameters that are common for all PUCCH resources of format 4. |
| resourceSetToAddModList, resourceSetToReleaseList <br> Lists for adding and releasing PUCCH resource sets (see TS 38.213 [13], clause 9.2). |
| resourceToAddModList, resourceToReleaseList <br> Lists for adding and releasing PUCCH resources applicable for the UL BWP and serving cell in which the *PUCCH-Config* is defined. The resources defined herein are referred to from other parts of the configuration to determine which resource the UE shall use for which report. If the network includes *resourceToAddModList-v16xy*, it includes the same number of entries, and listed in the same order, as in *resourceToAddModList* (i.e. without suffix). |
| spatialRelationInfoToAddModList <br> Configuration of the spatial relation between a reference RS and PUCCH. Reference RS can be SSB/CSI-RS/SRS. If the list has more than one element, MAC-CE selects a single element (see TS 38.321 [3], clause 5.18.8 and TS 38.213 [13], clause 9.2.2). |

FIG. 4E

| PUCCH-format3 field descriptions |
|---|
| nrofPRBs <br> The supported values are 1,2,3,4,5,6,8,9,10,12,15 and 16. |

| PUCCH-FormatConfig field descriptions |
|---|
| additionalDMRS <br> If the field is present, the UE enables 2 DMRS symbols per hop of a PUCCH Format 3 or 4 if both hops are more than X symbols when FH is enabled (X=4). And it enables 4 DMRS symbols for a PUCCH Format 3 or 4 with more than 2X+1 symbols when FH is disabled (X=4). The field is not applicable for format 1 and 2. See TS 38.213 [13], clause 9.2.2. |
| interslotFrequencyHopping <br> If the field is present, the UE enables inter-slot frequency hopping when PUCCH Format 1, 3 or 4 is repeated over multiple slots. For long PUCCH over multiple slots, the intra and inter slot frequency hopping cannot be enabled at the same time for a UE. The field is not applicable for format 2. See TS 38.213 [13], clause 9.2.6. |
| maxCodeRate <br> Max coding rate to determine how to feedback UCI on PUCCH for format 2, 3 or 4. The field is not applicable for format 1. See TS 38.213 [13], clause 9.2.5. |
| nrofSlots <br> Number of slots with the same PUCCH F1, F3 or F4. When the field is absent the UE applies the value n1. The field is not applicable for format 2. See TS 38.213 [13], clause 9.2.6. |
| pi2BPSK <br> If the field is present, the UE uses pi/2 BPSK for UCI symbols instead of QPSK for PUCCH. The field is not applicable for format 1 and 2. See TS 38.213 [13], clause 9.2.5. |
| simultaneousHARQ-ACK-CSI <br> If the field is present, the UE uses simultaneous transmission of CSI and HARQ-ACK feedback with or without SR with PUCCH Format 2, 3 or 4. See TS 38.213 [13], clause 9.2.5. When the field is absent the UE applies the value off. The field is not applicable for format 1. |

FIG.4F

PUCCH-Resource field descriptions pucch-ResourceGroupId
PUCCH resource group ID to which the PUCCH resource belongs.

format
Selection of the PUCCH format (format 0 – 4) and format-specific parameters, see TS 38.213 [13], clause 9.2. *format0* and *format1* are only allowed for a resource in a first PUCCH resource set. *format2*, *format3* and *format4* are only allowed for a resource in non-first PUCCH resource set.

intraSlotFrequencyHopping
Enabling intra-slot frequency hopping, applicable for all types of PUCCH formats. For long PUCCH over multiple slots, the intra and inter slot frequency hopping cannot be enabled at the same time for a UE. See TS 38.213 [13], clause 9.2.1.

pucch-ResourceId
Identifier of the PUCCH resource.

secondHopPRB
Index of first PRB after frequency hopping (for second hop) of PUCCH. This value is applicable for intra-slot frequency hopping. See TS 38.213 [13], clause 9.2.1.

PUCCH-ResourceSet field descriptions maxPayloadMinus1
Maximum number of payload bits minus 1 that the UE may transmit using this PUCCH resource set. In a PUCCH occurrence, the UE chooses the first of its *PUCCH-ResourceSet* which supports the number of bits that the UE wants to transmit. The field is absent in the first set (Set0) since the maximum Size of Set0 is specified to be 3 bits. The field is absent in the last configured set since the UE derives its maximum payload size as specified in TS 38.213 [13]. This field can take integer values that are multiples of 4 (see TS 38.213 [13], clause 9.2).

resourceList
PUCCH resources of *format0* and *format1* are only allowed in the first PUCCH resource set, i.e., in a PUCCH-ResourceSet with *pucch-ResourceSetId* = 0. This set may contain between 1 and 32 resources. PUCCH resources of *format2*, *format3* and *format4* are only allowed in a PUCCH-ResourceSet with *pucch-ResourceSetId* > 0. If present, these sets contain between 1 and 8 resources each. The UE chooses a PUCCH-Resource from this list as specified in TS 38.213 [13], clause 9.2.3. Note that this list contains only a list of resource IDs. The actual resources are configured in *PUCCH-Config*.

FIG.4G

PUCCH-SpatialRelationInfo

The IE *PUCCH-SpatialRelationInfo* is used to configure the spatial setting for PUCCH transmission and the parameters for PUCCH power control, see TS 38.213, [13], clause 9.2.2.

PUCCH-SpatialRelationInfo information element

```
-- ASN1START
-- TAG-PUCCH-SPATIALRELATIONINFO-START

PUCCH-SpatialRelationInfo ::=       SEQUENCE {
    pucch-SpatialRelationInfoId         PUCCH-SpatialRelationInfoId,
    servingCellId                       ServCellIndex                                   OPTIONAL,   -- Need S
    referenceSignal                     CHOICE {
        ssb-Index                           SSB-Index,
        csi-RS-Index                        NZP-CSI-RS-ResourceId,
        srs                                 SEQUENCE {
                                                resource            SRS-ResourceId,
                                                uplinkBWP           BWP-Id
                                            }
    },
    pucch-PathlossReferenceRS-Id        PUCCH-PathlossReferenceRS-Id,
    p0-PUCCH-Id                         P0-PUCCH-Id,
    closedLoopIndex                     ENUMERATED { i0, i1 }
}

PUCCH-SpatialRelationInfoExt-r16 ::= SEQUENCE {
    pucch-SpatialRelationInfoId-r16     PUCCH-SpatialRelationInfoId-r16,
    servingCellId-r16                   ServCellIndex,
    referenceSignal-r16                 CHOICE {
        ssb-Index-r16                       SSB-Index,
        csi-RS-Index-r16                    NZP-CSI-RS-ResourceId,
        srs-r16                             SEQUENCE {
                                                resource-r16        SRS-ResourceId,
                                                uplinkBWP-r16       BWP-Id
                                            }
    },
    pucch-PathlossReferenceRS-Id-r16    PUCCH-PathlossReferenceRS-Id,
    p0-PUCCH-Id-r16                     P0-PUCCH-Id,
    closedLoopIndex-r16                 ENUMERATED { i0, i1 }
}

PUCCH-SpatialRelationInfoId ::=     INTEGER (1..maxNrofSpatialRelationInfos)
PUCCH-SpatialRelationInfoId-r16 ::= INTEGER (1..maxNrofSpatialRelationInfos-r16)

-- TAG-PUCCH-SPATIALRELATIONINFO-STOP
-- ASN1STOP (MIDDLE PARTS OMITTED)
```

FIG.4H

6.4 RRC multiplicity and type constraint values

– Multiplicity and type constraint definitions

```
-- ASN1START
-- TAG-MULTIPLICITY-AND-TYPE-CONSTRAINT-DEFINITIONS-START maxBandComb                    INTEGER ::= 65536  -- Maximum number of DL band combinations
maxCellBlack                   INTEGER ::= 16     -- Maximum number of NR blacklisted cell ranges in SIB3, SIB4
maxCellInter                   INTEGER ::= 16     -- Maximum number of inter-Freq cells listed in SIB4

(MIDDLE PARTS OMITTED)

maxNrofSpatialRelationInfos    INTEGER ::= 8
maxNrofSpatialRelationInfos-r16 INTEGER ::= 64    -- Maximum number of spatial relation information pwer BWP in a cell
maxNrofIndexesToReport         INTEGER ::= 32
maxNrofIndexesToReport2        INTEGER ::= 64
maxNrofSSBs-1                  INTEGER ::= 63     -- Maximum number of SSB resources in a resource set minus 1.
maxNrofS-NSSAI                 INTEGER ::= 8      -- Maximum number of S-NSSAI.
maxNrofTCI-StatesPDCCH         INTEGER ::= 64
maxNrofTCI-States              INTEGER ::= 128    -- Maximum number of TCI states.
maxNrofTCI-States-1            INTEGER ::= 127    -- Maximum number of TCI states minus 1.
maxNrofUL-Allocations          INTEGER ::= 16     -- Maximum number of PUSCH time domain resource allocations.

(MIDDLE PARTS OMITTED)

maxInterRAT-RSTD-Freq          INTEGER ::= 3 maxNrofPUCCH-ResourceGroup-1   INTEGER ::= 127    -- Maximum number of PUCCH resource groups minus 1

-- TAG-MULTIPLICITY-AND-TYPE-CONSTRAINT-DEFINITIONS-STOP
-- ASN1STOP
```

FIG.5A

PUCCH-Config

The IE *PUCCH-Config* is used to configure UE specific PUCCH parameters (per BWP).

PUCCH-Config information element

```
-- ASN1START
-- TAG-PUCCH-CONFIG-START

PUCCH-Config ::=                              SEQUENCE {
    resourceSetToAddModList                   SEQUENCE (SIZE (1..maxNrofPUCCH-ResourceSets)) OF PUCCH-ResourceSet       OPTIONAL,   -- Need N
    resourceSetToReleaseList                  SEQUENCE (SIZE (1..maxNrofPUCCH-ResourceSets)) OF PUCCH-ResourceSetId     OPTIONAL,   -- Need N
    resourceToAddModList                      SEQUENCE (SIZE (1..maxNrofPUCCH-Resources)) OF PUCCH-Resource             OPTIONAL,   -- Need N
    resourceToReleaseList                     SEQUENCE (SIZE (1..maxNrofPUCCH-Resources)) OF PUCCH-ResourceId           OPTIONAL,   -- Need N
    format1                                   SetupRelease { PUCCH-FormatConfig }                                       OPTIONAL,   -- Need M
    format2                                   SetupRelease { PUCCH-FormatConfig }                                       OPTIONAL,   -- Need M
    format3                                   SetupRelease { PUCCH-FormatConfig }                                       OPTIONAL,   -- Need M
    format4                                   SetupRelease { PUCCH-FormatConfig }                                       OPTIONAL,   -- Need M
    schedulingRequestResourceToAddModList     SEQUENCE (SIZE (1..maxNrofSR-Resources)) OF SchedulingRequestResourceConfig
                                                                                                                        OPTIONAL,   -- Need N
    schedulingRequestResourceToReleaseList    SEQUENCE (SIZE (1..maxNrofSR-Resources)) OF SchedulingRequestResourceId
                                                                                                                        OPTIONAL,   -- Need N
    multi-CSI-PUCCH-ResourceList              SEQUENCE (SIZE (1..2)) OF PUCCH-ResourceId                                OPTIONAL,   -- Need M
    dl-DataToUL-ACK                           SEQUENCE (SIZE (1..8)) OF INTEGER (0..15)                                 OPTIONAL,   -- Need M
    spatialRelationInfoToAddModList           SEQUENCE (SIZE (1..maxNrofSpatialRelationInfos)) OF PUCCH-SpatialRelationInfo
                                                                                                                        OPTIONAL,   -- Need N
    spatialRelationInfoToReleaseList          SEQUENCE (SIZE (1..maxNrofSpatialRelationInfos)) OF PUCCH-SpatialRelationInfoId
                                                                                                                        OPTIONAL,   -- Need N
    pucch-PowerControl                        PUCCH-PowerControl                                                        OPTIONAL,   -- Need M
    ...,
    [[
    multi-TRP-PUCCH-ResourceSetList-r16       SEQUENCE (SIZE (1..maxNrofTRPs)) OF PUCCH-ResourceSetConfig-r16           OPTIONAL    -- Need N
    spatialRelationInfoToAddModListExt-r16    SEQUENCE (SIZE (1..maxNrofSpatialRelationInfos-r16)) OF PUCCH-SpatialRelationInfoExt-r16
                                                                                                                        OPTIONAL    -- Need N
    spatialRelationInfoToReleaseListExt-r16   SEQUENCE (SIZE (1..maxNrofSpatialRelationInfos-r16)) OF PUCCH-SpatialRelationInfoId-r16
                                                                                                                        OPTIONAL    -- Need N
    ]]
}
```

FIG.5B

```
PUCCH-FormatConfig ::=             SEQUENCE {
    interslotFrequencyHopping          ENUMERATED {enabled}                OPTIONAL,  -- Need R
    additionalDMRS                     ENUMERATED {true}                   OPTIONAL,  -- Need R
    maxCodeRate                        PUCCH-MaxCodeRate                   OPTIONAL,  -- Need R
    nrofSlots                          ENUMERATED {n2,n4,n8}               OPTIONAL,  -- Need S
    pi2BPSK                            ENUMERATED {enabled}                OPTIONAL,  -- Need R
    simultaneousHARQ-ACK-CSI           ENUMERATED {true}                   OPTIONAL   -- Need R
}

PUCCH-MaxCodeRate ::=              ENUMERATED {zeroDot08, zeroDot15, zeroDot25, zeroDot35, zeroDot45, zeroDot60, zeroDot80}

PUCCH-ResourceSetConfig-r16 ::=    SEQUENCE {
    resourceSetToAddModList-r16        SEQUENCE (SIZE (1..maxNrofPUCCH-ResourceSets)) OF PUCCH-ResourceSet     OPTIONAL,  -- Need N
    resourceSetToReleaseList-r16       SEQUENCE (SIZE (1..maxNrofPUCCH-ResourceSets)) OF PUCCH-ResourceSetId   OPTIONAL   -- Need N
}

-- A set with one or more PUCCH resources
PUCCH-ResourceSet ::=              SEQUENCE {
    pucch-ResourceSetId                PUCCH-ResourceSetId,
    resourceList                       SEQUENCE (SIZE (1..maxNrofPUCCH-ResourcesPerSet)) OF PUCCH-ResourceId,
    maxPayloadMinus1                   INTEGER (4..256)                    OPTIONAL   -- Need R
}

PUCCH-ResourceSetId ::=            INTEGER (0..maxNrofPUCCH-ResourceSets-1)

PUCCH-Resource ::=                 SEQUENCE {
    pucch-ResourceId                   PUCCH-ResourceId,
    startingPRB                        PRB-Id,
    intraSlotFrequencyHopping          ENUMERATED { enabled }              OPTIONAL,  -- Need R
    secondHopPRB                       PRB-Id                              OPTIONAL,  -- Need R
    format                             CHOICE {
        format0                            PUCCH-format0,
        format1                            PUCCH-format1,
        format2                            PUCCH-format2,
        format3                            PUCCH-format3,
        format4                            PUCCH-format4
    }
}

PUCCH-ResourceId ::=               INTEGER (0..maxNrofPUCCH-Resources-1)
```

FIG.5C

```
PUCCH-format0 ::=            SEQUENCE {
    initialCyclicShift           INTEGER(0..11),
    nrofSymbols                  INTEGER (1..2),
    startingSymbolIndex          INTEGER(0..13)
}

PUCCH-format1 ::=            SEQUENCE {
    initialCyclicShift           INTEGER(0..11),
    nrofSymbols                  INTEGER (4..14),
    startingSymbolIndex          INTEGER(0..10),
    timeDomainOCC                INTEGER (0..6)
}

PUCCH-format2 ::=            SEQUENCE {
    nrofPRBs                     INTEGER (1..16),
    nrofSymbols                  INTEGER (1..2),
    startingSymbolIndex          INTEGER(0..13)
}

PUCCH-format3 ::=            SEQUENCE {
    nrofPRBs                     INTEGER (1..16),
    nrofSymbols                  INTEGER (4..14),
    startingSymbolIndex          INTEGER(0..10)
}

PUCCH-format4 ::=            SEQUENCE {
    nrofSymbols                  INTEGER (4..14),
    occ-Length                   ENUMERATED {n2,n4},
    occ-Index                    ENUMERATED {n0,n1,n2,n3},
    startingSymbolIndex          INTEGER(0..10)
}

-- TAG-PUCCH-CONFIG-STOP
-- ASN1STOP
```

FIG.5D

| PUCCH-Config field descriptions |
|---|
| *dl-DataToUL-ACK* |
| List of timing for given PDSCH to the DL ACK (see TS 38.213 [13], clause 9.1.2). |
| *format1* |
| Parameters that are common for all PUCCH resources of format 1. |
| *format2* |
| Parameters that are common for all PUCCH resources of format 2. |
| *format3* |
| Parameters that are common for all PUCCH resources of format 3. |
| *format4.* |
| Parameters that are common for all PUCCH resources of format 4 |
| *multi-TRP-PUCCH-ResourceSetList* |
| List of PUCCH resource sets configured for each TRP. The first entry of this list corresponds to the PUCCH resource sets configured for TRP #1. The second entry of this list corresponds to the PUCCH resource sets configured for TRP #2, and so on. The *resourceSetToAddModList* (without suffix) and *resourceSetToReleaseList* (without suffix) are used to configure the PUCCH resource sets configured for TRP #0. |
| *resourceSetToAddModList, resourceSetToReleaseList* |
| Lists for adding and releasing PUCCH resource sets (see TS 38.213 [13], clause 9.2). |
| *resourceToAddModList, resourceToReleaseList* |
| Lists for adding and releasing PUCCH resources applicable for the UL BWP and serving cell in which the *PUCCH-Config* is defined. The resources defined herein are referred to from other parts of the configuration to determine which resource the UE shall use for which report. |
| *spatialRelationInfoToAddModList* |
| Configuration of the spatial relation between a reference RS and PUCCH. Reference RS can be SSB/CSI-RS/SRS. If the list has more than one element, MAC-CE selects a single element (see TS 38.321 [3], clause 5.18.8 and TS 38.213 [13], clause 9.2.2). |

FIG. 5E

PUCCH-SpatialRelationInfo

The IE *PUCCH-SpatialRelationInfo* is used to configure the spatial setting for PUCCH transmission and the parameters for PUCCH power control, see TS 38.213, [13], clause 9.2.2.

*PUCCH-SpatialRelationInfo information element*

```
-- ASN1START
-- TAG-PUCCH-SPATIALRELATIONINFO-START

PUCCH-SpatialRelationInfo ::=       SEQUENCE {
    pucch-SpatialRelationInfoId         PUCCH-SpatialRelationInfoId,
    servingCellId                       ServCellIndex                                           OPTIONAL,   -- Need S
    referenceSignal                     CHOICE {
        ssb-Index                           SSB-Index,
        csi-RS-Index                        NZP-CSI-RS-ResourceId,
        srs                                 SEQUENCE {
                                                resource                SRS-ResourceId,
                                                uplinkBWP               BWP-Id
                                            }
                                        },
    pucch-PathlossReferenceRS-Id        PUCCH-PathlossReferenceRS-Id,
    p0-PUCCH-Id                         P0-PUCCH-Id,
    closedLoopIndex                     ENUMERATED ( i0, i1 )
}

PUCCH-SpatialRelationInfoExt-r16 ::=  SEQUENCE {
    pucch-SpatialRelationInfoId-r16       PUCCH-SpatialRelationInfoId,
    servingCellId-r16                     ServCellIndex                                         OPTIONAL,   -- Need S
    referenceSignal-r16                   CHOICE {
        ssb-Index-r16                         SSB-Index,
        csi-RS-Index-r16                      NZP-CSI-RS-ResourceId,
        srs-r16                               SEQUENCE {
                                                  resource-r16             SRS-ResourceId,
                                                  uplinkBWP-r16            BWP-Id
                                              }
                                          },
    pucch-PathlossReferenceRS-Id-r16      PUCCH-PathlossReferenceRS-Id,
    p0-PUCCH-Id-r16                       P0-PUCCH-Id,
    closedLoopIndex-r16                   ENUMERATED ( i0, i1 )
}

PUCCH-SpatialRelationInfoId ::=         INTEGER (1..maxNrofSpatialRelationInfos)

PUCCH-SpatialRelationInfoId-r16 ::=     INTEGER (1..maxNrofSpatialRelationInfos-r16)

-- TAG-PUCCH-SPATIALRELATIONINFO-STOP
-- ASN1STOP
```

FIG.5F

6.4 RRC multiplicity and type constraint values

– Multiplicity and type constraint definitions

```
-- ASN1START
-- TAG-MULTIPLICITY-AND-TYPE-CONSTRAINT-DEFINITIONS-START maxBandComb                     INTEGER ::= 65536  -- Maximum number of DL band combinations
maxCellBlack                    INTEGER ::= 16     -- Maximum number of NR blacklisted cell ranges in SIB3, SIB4
maxCellInter                    INTEGER ::= 16     -- Maximum number of inter-Freq cells listed in SIB4

(MIDDLE PARTS OMITTED)

maxNrofSpatialRelationInfos     INTEGER ::= 8
maxNrofSpatialRelationInfos-r16 INTEGER ::= 64     -- Maximum number of spatial relation information pwer BWP in a cell
maxNrofIndexesToReport          INTEGER ::= 32
maxNrofIndexesToReport2         INTEGER ::= 64
maxNrofSSBs-1                   INTEGER ::= 63     -- Maximum number of SSB resources in a resource set minus 1.
maxNrofS-NSSAI                  INTEGER ::= 8      -- Maximum number of S-NSSAI.
maxNrofTCI-StatesPDCCH          INTEGER ::= 64
maxNrofTCI-States               INTEGER ::= 128    -- Maximum number of TCI states.
maxNrofTCI-States-1             INTEGER ::= 127    -- Maximum number of TCI states minus 1.
maxNrofUL-Allocations           INTEGER ::= 16     -- Maximum number of PUSCH time domain resource allocations.

(MIDDLE PARTS OMITTED)

maxInterRAT-RSTD-Freq           INTEGER ::= 3 maxNrofTRPs                     INTEGER ::= 128    -- Maximum number of TRPs

-- TAG-MULTIPLICITY-AND-TYPE-CONSTRAINT-DEFINITIONS-STOP
-- ASN1STOP
```

FIG.6A

BWP-UplinkDedicated

The IE *BWP-UplinkDedicated* is used to configure the dedicated (UE specific) parameters of an uplink BWP.

***BWP-UplinkDedicated* information element**

```
-- ASN1START
-- TAG-BWP-UPLINKDEDICATED-START

BWP-UplinkDedicated ::=        SEQUENCE {
    pucch-Config                   SetupRelease { PUCCH-Config }              OPTIONAL,     -- Need M
    pusch-Config                   SetupRelease { PUSCH-Config }              OPTIONAL,     -- Need M
    configuredGrantConfig          SetupRelease { ConfiguredGrantConfig }     OPTIONAL,     -- Need M
    srs-Config                     SetupRelease { SRS-Config }                OPTIONAL,     -- Need M
    beamFailureRecoveryConfig      SetupRelease { BeamFailureRecoveryConfig } OPTIONAL,     -- Cond SpCellOnly
    ...,
    [[
    multi-TRP-PUCCH-ConfigList     SEQUENCE (SIZE (1..maxNrofTRPs)) OF SetupRelease { PUCCH-Config }    OPTIONAL  -- Need M
    ]]
}

-- TAG-BWP-UPLINKDEDICATED-STOP
-- ASN1STOP
```

FIG.6B

| BWP-UplinkDedicated field descriptions |
|---|
| beamFailureRecoveryConfig |
| Configuration of beam failure recovery. If *supplementaryUplink* is present, the field is present only in one of the uplink carriers, either UL or SUL. |
| configuredGrantConfig |
| A *Configured-Grant* of *type1* or *type2*. It may be configured for UL or SUL but in case of *type1* not for both at a time. Except for reconfiguration with sync, the NW does not reconfigure *configuredGrantConfig* when there is an active configured uplink grant Type 2 (see TS 38.321 [3]). However, the NW may release the *configuredGrantConfig* at any time. |
| multi-TRP-PUCCH-ConfigList |
| List of PUCCH configurations for each TRP. The first entry of this list corresponds to the PUCCH configuration for TRP #1. The second entry of this list corresponds to the PUCCH configuration for TRP #2, and so on. The pucch-Config (without suffix) is used to configure the PUCCH configuration for TRP #0. |
| pucch-Config |
| PUCCH configuration for one BWP of the normal UL or SUL of a serving cell. If the UE is configured with SUL, the network configures PUCCH only on the BWPs of one of the uplinks (normal UL or SUL). The network configures *PUCCH-Config* at least on non-initial BWP(s) for SpCell and PUCCH SCell. If supported by the UE, the network may configure at most one additional SCell of a cell group with *PUCCH-Config* (i.e. PUCCH SCell). |
| In EN-DC, The NW configures at most one serving cell per frequency range with PUCCH. And in EN-DC, if two PUCCH groups are configured, the serving cells of the NR PUCCH group in FR2 use the same numerology. |
| The NW may configure PUCCH for a BWP when setting up the BWP. The network may also add/remove the *pucch-Config* in an *RRCReconfiguration* with *reconfigurationWithSync* (for SpCell or PUCCH SCell) or with SCell release and add (for PUCCH SCell) to move the PUCCH between the UL and SUL carrier of one serving cell. In other cases, only modifications of a previously configured *pucch-Config* are allowed. |
| If one (S)UL BWP of a serving cell is configured with PUCCH, all other (S)UL BWPs must be configured with PUCCH, too. |
| pusch-Config |
| PUSCH configuration for one BWP of the normal UL or SUL of a serving cell. If the UE is configured with SUL and if it has a *PUSCH-Config* for both UL and SUL, an UL/SUL indicator field in DCI indicates which of the two to use. See TS 38.212 [17], clause 7.3.1. |
| srs-Config |
| Uplink sounding reference signal configuration. |

FIG.6C

PUCCH-Config

— The IE *PUCCH-Config* is used to configure UE specific PUCCH parameters (per BWP).

PUCCH-Config information element

```
-- ASN1START
-- TAG-PUCCH-CONFIG-START

PUCCH-Config ::=                    SEQUENCE {
    resourceSetToAddModList            SEQUENCE (SIZE (1..maxNrofPUCCH-ResourceSets)) OF PUCCH-ResourceSet        OPTIONAL,  -- Need N
    resourceSetToReleaseList           SEQUENCE (SIZE (1..maxNrofPUCCH-ResourceSets)) OF PUCCH-ResourceSetId      OPTIONAL,  -- Need N
    resourceToAddModList               SEQUENCE (SIZE (1..maxNrofPUCCH-Resources))    OF PUCCH-Resource           OPTIONAL,  -- Need N
    resourceToReleaseList              SEQUENCE (SIZE (1..maxNrofPUCCH-Resources))    OF PUCCH-ResourceId         OPTIONAL,  -- Need N
    format1                            SetupRelease { PUCCH-FormatConfig }                                        OPTIONAL,  -- Need M
    format2                            SetupRelease { PUCCH-FormatConfig }                                        OPTIONAL,  -- Need M
    format3                            SetupRelease { PUCCH-FormatConfig }                                        OPTIONAL,  -- Need M
    format4                            SetupRelease { PUCCH-FormatConfig }                                        OPTIONAL,  -- Need M schedulingRequestResourceToAddModList   SEQUENCE (SIZE (1..maxNrofSR-Resources)) OF SchedulingRequestResourceConfig
                                                                                                                  OPTIONAL,  -- Need N
    schedulingRequestResourceToReleaseList  SEQUENCE (SIZE (1..maxNrofSR-Resources)) OF SchedulingRequestResourceId
                                                                                                                  OPTIONAL,  -- Need N
    multi-CSI-PUCCH-ResourceList       SEQUENCE (SIZE (1..2)) OF PUCCH-ResourceId                                 OPTIONAL,  -- Need M
    dl-DataToUL-ACK                    SEQUENCE (SIZE (1..8)) OF INTEGER (0..15)                                  OPTIONAL,  -- Need M spatialRelationInfoToAddModList    SEQUENCE (SIZE (1..maxNrofSpatialRelationInfos)) OF PUCCH-SpatialRelationInfo
                                                                                                                  OPTIONAL,  -- Need N
    spatialRelationInfoToReleaseList   SEQUENCE (SIZE (1..maxNrofSpatialRelationInfos)) OF PUCCH-SpatialRelationInfoId
                                                                                                                  OPTIONAL,  -- Need N
    pucch-PowerControl                 PUCCH-PowerControl                                                         OPTIONAL,  -- Need M
    ...,
    [[
    spatialRelationInfoToAddModListExt-r16  SEQUENCE (SIZE (1..maxNrofSpatialRelationInfos-r16)) OF PUCCH-SpatialRelationInfoExt-r16
                                                                                                                  OPTIONAL,  -- Need N
    spatialRelationInfoToReleaseListExt-r16 SEQUENCE (SIZE (1..maxNrofSpatialRelationInfos-r16)) OF PUCCH-SpatialRelationInfoId
                                                                                                                  OPTIONAL   -- Need N
    ]]
}

PUCCH-FormatConfig ::=              SEQUENCE {
    interslotFrequencyHopping          ENUMERATED {enabled}                                                       OPTIONAL,  -- Need R
    additionalDMRS                     ENUMERATED {true}                                                          OPTIONAL,  -- Need R
    maxCodeRate                        PUCCH-MaxCodeRate                                                          OPTIONAL,  -- Need R
    nrofSlots                          ENUMERATED {n2,n4,n8}                                                      OPTIONAL,  -- Need S
    pi2BPSK                            ENUMERATED {enabled}                                                       OPTIONAL,  -- Need R
    simultaneousHARQ-ACK-CSI           ENUMERATED {true}                                                          OPTIONAL   -- Need R
}
```

FIG.6D

```
PUCCH-MaxCodeRate ::=            ENUMERATED {zeroDot08, zeroDot15, zeroDot25, zeroDot35, zeroDot45, zeroDot60, zeroDot80}

-- A set with one or more PUCCH resources
PUCCH-ResourceSet ::=            SEQUENCE {
    pucch-ResourceSetId              PUCCH-ResourceSetId,
    resourceList                     SEQUENCE (SIZE (1..maxNrofPUCCH-ResourcesPerSet)) OF PUCCH-ResourceId,
    maxPayloadMinus1                 INTEGER (4..256)                                                         OPTIONAL    -- Need R
}

PUCCH-ResourceSetId ::=          INTEGER (0..maxNrofPUCCH-ResourceSets-1)

PUCCH-Resource ::=               SEQUENCE {
    pucch-ResourceId                 PUCCH-ResourceId,
    startingPRB                      PRB-Id,
    intraSlotFrequencyHopping        ENUMERATED { enabled }                                                   OPTIONAL,   -- Need R
    secondHopPRB                     PRB-Id                                                                   OPTIONAL,   -- Need R
    format                           CHOICE {
                                        PUCCH-format0,
                                        PUCCH-format1,
                                        PUCCH-format2,
                                        PUCCH-format3,
                                        PUCCH-format4
                                     }
}

PUCCH-ResourceId ::=             INTEGER (0..maxNrofPUCCH-Resources-1)

PUCCH-format0 ::=                SEQUENCE {
    initialCyclicShift               INTEGER(0..11),
    nrofSymbols                      INTEGER (1..2),
    startingSymbolIndex              INTEGER(0..13)
}

PUCCH-format1 ::=                SEQUENCE {
    initialCyclicShift               INTEGER(0..11),
    nrofSymbols                      INTEGER (4..14),
    startingSymbolIndex              INTEGER(0..10),
    timeDomainOCC                    INTEGER(0..6)
}

PUCCH-format2 ::=                SEQUENCE {
    nrofPRBs                         INTEGER (1..16),
    nrofSymbols                      INTEGER (1..2),
    startingSymbolIndex              INTEGER(0..13)
}

PUCCH-format3 ::=                SEQUENCE {
    nrofPRBs                         INTEGER (1..16),
    nrofSymbols                      INTEGER (4..14),
```

FIG.6E

```
    startingSymbolIndex            INTEGER(0..10)
}

PUCCH-format4 ::=     SEQUENCE {
    nrofSymbols           INTEGER (4..14),
    occ-Length            ENUMERATED {n2,n4},
    occ-Index             ENUMERATED {n0,n1,n2,n3},
    startingSymbolIndex   INTEGER(0..10)
}

-- TAG-PUCCH-CONFIG-STOP
-- ASN1STOP
```

FIG.6F

PUCCH-SpatialRelationInfo

The IE *PUCCH-SpatialRelationInfo* is used to configure the spatial setting for PUCCH transmission and the parameters for PUCCH power control, see TS 38.213, [13], clause 9.2.2.

PUCCH-SpatialRelationInfo information element

```
-- ASN1START
-- TAG-PUCCH-SPATIALRELATIONINFO-START

PUCCH-SpatialRelationInfo ::=    SEQUENCE {
    pucch-SpatialRelationInfoId     PUCCH-SpatialRelationInfoId,
    servingCellId                   ServCellIndex                                   OPTIONAL,    -- Need S
    referenceSignal                 CHOICE {
        ssb-Index                       SSB-Index,
        csi-RS-Index                    NZP-CSI-RS-ResourceId,
        srs                             SEQUENCE {
                                            resource                SRS-ResourceId,
                                            uplinkBWP               BWP-Id
                                        }
    },
    pucch-PathlossReferenceRS-Id    PUCCH-PathlossReferenceRS-Id,
    p0-PUCCH-Id                     P0-PUCCH-Id,
    closedLoopIndex                 ENUMERATED { i0, i1 }
}

PUCCH-SpatialRelationInfoExt-r16 ::=  SEQUENCE {
    pucch-SpatialRelationInfoId-r16     PUCCH-SpatialRelationInfoId-r16
    servingCellId-r16                   ServCellIndex
    referenceSignal-r16                 CHOICE {
        ssb-Index-r16                       SSB-Index,
        csi-RS-Index-r16                    NZP-CSI-RS-ResourceId,
        srs-r16                             SEQUENCE {
                                                resource-r16            SRS-ResourceId,
                                                uplinkBWP-r16           BWP-Id
                                            }
    },
    pucch-PathlossReferenceRS-Id-r16    PUCCH-PathlossReferenceRS-Id,
    p0-PUCCH-Id-r16                     P0-PUCCH-Id,
    closedLoopIndex-r16                 ENUMERATED { i0, i1 }                         OPTIONAL,    -- Need S
}

PUCCH-SpatialRelationInfoId ::=         INTEGER (1..maxNrofSpatialRelationInfos)
PUCCH-SpatialRelationInfoId-r16 ::=     INTEGER (1..maxNrofSpatialRelationInfos-r16)

-- TAG-PUCCH-SPATIALRELATIONINFO-STOP
```

FIG.6H

6.4 RRC multiplicity and type constraint values

— Multiplicity and type constraint definitions

```
-- ASN1START
-- TAG-MULTIPLICITY-AND-TYPE-CONSTRAINT-DEFINITIONS-START maxBandComb                        INTEGER ::= 65536   -- Maximum number of DL band combinations
maxCellBlack                       INTEGER ::= 16      -- Maximum number of NR blacklisted cell ranges in SIB3, SIB4
maxCellInter                       INTEGER ::= 16      -- Maximum number of inter-Freq cells listed in SIB4

(MIDDLE PARTS OMITTED)

maxNrofSpatialRelationInfos        INTEGER ::= 8
maxNrofSpatialRelationInfos-r16    INTEGER ::= 64      -- Maximum number of spatial relation information pwer BWP in a cell
maxNrofIndexesToReport             INTEGER ::= 32
maxNrofIndexesToReport2            INTEGER ::= 64
maxNrofSSBs-1                      INTEGER ::= 63      -- Maximum number of SSB resources in a resource set minus 1.
maxNrofS-NSSAI                     INTEGER ::= 8       -- Maximum number of S-NSSAI.
maxNrofTCI-StatesPDCCH             INTEGER ::= 64
maxNrofTCI-States                  INTEGER ::= 128     -- Maximum number of TCI states.
maxNrofTCI-States-1                INTEGER ::= 127     -- Maximum number of TCI states minus 1.
maxNrofUL-Allocations              INTEGER ::= 16      -- Maximum number of PUSCH time domain resource allocations.

(MIDDLE PARTS OMITTED)

maxInterRAT-RSTD-Freq              INTEGER ::= 3 maxNrofTRPs                        INTEGER ::= 128     -- Maximum number of TRPs

-- TAG-MULTIPLICITY-AND-TYPE-CONSTRAINT-DEFINITIONS-STOP
-- ASN1STOP
```

6.1.3.18 PUCCH spatial relation Activation/Deactivation MAC CE

The PUCCH spatial relation Activation/Deactivation MAC CE is identified by a MAC subheader with LCID as specified in Table 6.2.1-1. It has a fixed size of 24 bits with following fields:

- Serving Cell ID: This field indicates the identity of the Serving Cell for which the MAC CE applies. The length of the field is 5 bits;

- BWP ID: This field indicates a UL BWP for which the MAC CE applies as the codepoint of the DCI *bandwidth part indicator* field as specified in TS 38.212 [9]. The length of the BWP ID field is 2 bits;

- Gr: This field indicates an identifier of the PUCCH resource identified by *PUCCH-ResourceGroupId* as specified in TS 38.331 [5]. If this field is set to 0, it corresponds to 0 of PUCCH resource group ID. If this field is set to 1, it corresponds to 1 of PUCCH resource group ID.

- PUCCH Resource ID: This field contains an identifier of the PUCCH resource ID identified by *PUCCH-ResourceId* as specified in TS 38.331 [5]. The length of the field is 7 bits;

- $S_i$: If there is a PUCCH Spatial Relation Info with *PUCCH-SpatialRelationInfoId* as specified in TS 38.331 [5], configured for the uplink bandwidth part indicated by BWP ID field, $S_i$ indicates the activation status of PUCCH Spatial Relation Info with *PUCCH-SpatialRelationInfoId* equal to i+1, otherwise MAC entity shall ignore this field. The $S_i$ field is set to 1 to indicate PUCCH Spatial Relation Info with *PUCCH-SpatialRelationInfoId* equal to i+1 shall be activated. The $S_i$ field is set to 0 to indicate PUCCH Spatial Relation Info with *PUCCH-SpatialRelationInfoId* equal to i+1 shall be deactivated. Only a single PUCCH Spatial Relation Info can be active for a PUCCH Resource at a time;

- R: Reserved bit, set to 0.

| R | Serving Cell ID | BWP ID | Oct 1 |
| R | PUCCH Resource ID | | Oct 2 |
| $S_7$ | $S_6$ $S_5$ $S_4$ $S_3$ $S_2$ $S_1$ | $S_0$ | Oct 3 |

Figure 6.1.3.18-1: PUCCH spatial relation Activation/Deactivation MAC CE of three octets

FIG. 7A

| R | | | | | | | | | Oct 1 |
|---|---|---|---|---|---|---|---|---|---|
| Gr | Serving Cell ID | | | | | | | | Oct 2 |
| $S_7$ | $S_6$ | $S_5$ | $S_4$ | $S_3$ | $S_2$ | $S_1$ | $S_0$ | BWP ID | Oct 3 |
| $S_{15}$ | $S_{14}$ | $S_{13}$ | $S_{12}$ | $S_{11}$ | $S_{10}$ | $S_9$ | $S_8$ | | Oct 4 |
| $S_{23}$ | $S_{22}$ | $S_{21}$ | $S_{20}$ | $S_{19}$ | $S_{18}$ | $S_{17}$ | $S_{16}$ | | Oct 5 |
| $S_{31}$ | $S_{30}$ | $S_{29}$ | $S_{28}$ | $S_{27}$ | $S_{26}$ | $S_{25}$ | $S_{24}$ | PUCCH Resource ID | Oct 6 |
| $S_{39}$ | $S_{38}$ | $S_{37}$ | $S_{36}$ | $S_{35}$ | $S_{34}$ | $S_{33}$ | $S_{32}$ | | Oct 7 |
| $S_{47}$ | $S_{46}$ | $S_{45}$ | $S_{44}$ | $S_{43}$ | $S_{42}$ | $S_{41}$ | $S_{40}$ | | Oct 8 |
| $S_{55}$ | $S_{54}$ | $S_{53}$ | $S_{52}$ | $S_{51}$ | $S_{50}$ | $S_{49}$ | $S_{48}$ | | Oct 9 |
| $S_{63}$ | $S_{62}$ | $S_{61}$ | $S_{60}$ | $S_{59}$ | $S_{58}$ | $S_{57}$ | $S_{56}$ | | Oct 10 |

Figure 6.1.3.18-2: PUCCH spatial relation Activation/Deactivation MAC CE of 10 octets

5.18.8 Activation/Deactivation of spatial relation of PUCCH resource

The network may activate and deactivate a spatial relation for a PUCCH resource of a Serving Cell by sending the PUCCH spatial relation Activation/Deactivation MAC CE described in clause 6.1.3.18, or the Multiple Entry PUCCH spatial relation Activation/Deactivation MAC CE described in clause 6.1.3.XX.

The MAC entity shall:

> 1> if the MAC entity receives a PUCCH spatial relation Activation/Deactivation MAC CE or Multiple Entry PUCCH spatial relation Activation/Deactivation MAC CE on a Serving Cell:
>
> > 2> indicate to lower layers the information regarding the PUCCH spatial relation Activation/Deactivation MAC CE or the Multiple Entry PUCCH spatial relation Activation/Deactivation MAC CE.

5.18.9 Activation/Deactivation of semi-persistent ZP CSI-RS resource set

The network may activate and deactivate the configured Semi-persistent ZP CSI-RS resource set of a Serving Cell by sending the SP ZP CSI-RS Resource Set Activation/Deactivation MAC CE described in clause 6.1.3.19. The configured Semi-persistent ZP CSI-RS resource sets are initially deactivated upon configuration and after a handover.

The MAC entity shall:

> 1> if the MAC entity receives an SP ZP CSI-RS Resource Set Activation/Deactivation MAC CE on a Serving Cell:
>
> > 2> indicate to lower layers the information regarding the SP ZP CSI-RS Resource Set Activation/Deactivation MAC CE.

FIG.8B

6.1.3.XX    Multiple entry PUCCH spatial relation Activation/Deactivation MAC CE

The Multiple Entry PUCCH spatial relation Activation/Deactivation MAC CE is identified by a MAC subheader with LCID as specified in Table 6.2.1-1.

It has a variable size, and includes serving cell ID, BWP ID, the bitmap and activated/ deactivated spatial relations for a given PUCCH resource ID. A single octet bitmap is used for indicating activation/ deactivation of PUCCH relation per PUCCH resource group ID. The activation/ deactivation of PUCCH spatial relations is included in ascending order based on the PUCCH resource group ID indicated by the bitmap.

- Serving Cell ID: This field indicates the identity of the Serving Cell for which the MAC CE applies. The length of the field is 5 bits:

- BWP ID: This field indicates a UL BWP for which the MAC CE applies as the codepoint of the DCI *bandwidth part indicator* field as specified in TS 38.212 [9]. The length of the BWP ID field is 2 bits:

- Gᵢ : This field indicates the presence of an activation/ deactivation field of PUCCH spatial relation for the PUCCH resource group ID with *PUCCH-ResourceGroupId* i as specified in TS 38.331 [5]. The Gᵢ field set to 1 indicates that an activation/ deactivation field of PUCCH spatial relation for the PUCCH resource group ID with *PUCCH-ResourceGroupId* i is reported. The Gᵢ field set to 0 indicates that an activation/ deactivation field of PUCCH spatial relation for the PUCCH resource group ID with *PUCCH-ResourceGroupId* is not reported.

- PUCCH Resource ID: This field contains an identifier of the PUCCH resource ID identified by *PUCCH-ResourceId* as specified in TS 38.331 [5]. The length of the field is 7 bits:

- PUCCH Spatial Relation Information ID: This field indicates an activated PUCCH Spatial Relation Info for the PUCCH resource indicated by the PUCCH Resource ID with *PUCCH-SpatialRelationInfoId-r16* as specified in TS 38.331 [5]. The length of the field is 6 bits:

- R: Reserved bit, set to 0.

FIG.8C

| R | | | | | | | |
|---|---|---|---|---|---|---|---|
| Serving Cell ID | | | | | | | BWP ID | Oct 1
| Gr7 | Gr6 | Gr5 | Gr4 | Gr3 | Gr2 | Gr1 | Gr0 | Oct 2
| PUCCH Resource ID | | | | | | | | Oct 3
| R | PUCCH Spatial Relation Information ID | | | | | | | Oct 4
| PUCCH Resource ID | | | | | | | | Oct 5
| R | PUCCH Spatial Relation Information ID | | | | | | | Oct 6
| ... | | | | | | | |
| PUCCH Resource ID | | | | | | | | Oct N-1
| R | PUCCH Spatial Relation Information ID | | | | | | | Oct N Figure 6.1.3.18-1: Multiple Entry PUCCH spatial relation Activation/Deactivation MAC CE

FIG.9A

5.18.8  Activation/Deactivation of spatial relation of PUCCH resource

The network may activate and deactivate a spatial relation for a PUCCH resource of a Serving Cell by sending the PUCCH spatial relation Activation/Deactivation MAC CE described in clause 6.1.3.18, or the Extended PUCCH spatial relation Activation/Deactivation MAC CE described in clause 6.1.3.XX.

The MAC entity shall:

1> if the MAC entity receives a PUCCH spatial relation Activation/Deactivation MAC CE or Extended PUCCH spatial relation Activation/Deactivation MAC CE on a Serving Cell:

2> indicate to lower layers the information regarding the PUCCH spatial relation Activation/Deactivation MAC CE or the Extended PUCCH spatial relation Activation/Deactivation MAC CE.

5.18.9  Activation/Deactivation of semi-persistent ZP CSI-RS resource set

The network may activate and deactivate the configured Semi-persistent ZP CSI-RS resource set of a Serving Cell by sending the SP ZP CSI-RS Resource Set Activation/Deactivation MAC CE described in clause 6.1.3.19. The configured Semi-persistent ZP CSI-RS resource sets are initially deactivated upon configuration and after a handover.

The MAC entity shall:

1> if the MAC entity receives an SP ZP CSI-RS Resource Set Activation/Deactivation MAC CE on a Serving Cell:

2> indicate to lower layers the information regarding the SP ZP CSI-RS Resource Set Activation/Deactivation MAC CE.

FIG.9B

6.1.3.XX  Extended PUCCH spatial relation Activation/Deactivation MAC CE

The Extended PUCCH spatial relation Activation/Deactivation MAC CE is identified by a MAC subheader with LCID as specified in Table 6.2.1-1. It has a fixed size of 24 bits with following fields:

- Serving Cell ID: This field indicates the identity of the Serving Cell for which the MAC CE applies. The length of the field is 5 bits;

- BWP ID: This field indicates a UL BWP for which the MAC CE applies as the codepoint of the DCI *bandwidth part indicator* field as specified in TS 38.212 [9]. The length of the BWP ID field is 2 bits;

- PUCCH Resource Group ID:  This field contains an identifier of the PUCCH resource group identified by *PUCCH-ResourceGroupId* as specified in TS 38.331 [5]. The PUCCH Resource group ID indicates the PUCCH resource group to which the PUCCH resource indicated by PUCCH Resource ID belongs. The length of the field is 3 bits.

- PUCCH Resource ID: This field contains an identifier of the PUCCH resource ID identified by *PUCCH-ResourceId* as specified in TS 38.331 [5]. The length of the field is 7 bits;

- PUCCH Spatial Relation Information ID: This field indicates an activated PUCCH Spatial Relation Info for the PUCCH resource indicated by the PUCCH Resource ID with *PUCCH-SpatialRelationInfoId-r16* as specified in TS 38.331 [5]. The length of the field is 6 bits;

- R: Reserved bit, set to 0.

Figure 6.1.3.XX-1: Extended PUCCH spatial relation Activation/Deactivation MAC CE

FIG.10A

5.18.8 Activation/Deactivation of spatial relation of PUCCH resource

The network may activate and deactivate a spatial relation for a PUCCH resource of a Serving Cell by sending the PUCCH spatial relation Activation/Deactivation MAC CE described in clause 6.1.3.18, or the Extended PUCCH spatial relation Activation/Deactivation MAC CE described in clause 6.1.3.XX.

The MAC entity shall:

1> if the MAC entity receives a PUCCH spatial relation Activation/Deactivation MAC CE or Extended PUCCH spatial relation Activation/Deactivation MAC CE on a Serving Cell:

2> indicate to lower layers the information regarding the PUCCH spatial relation Activation/Deactivation MAC CE or the Extended PUCCH spatial relation Activation/Deactivation MAC CE.

5.18.9 Activation/Deactivation of semi-persistent ZP CSI-RS resource set

The network may activate and deactivate the configured Semi-persistent ZP CSI-RS resource set of a Serving Cell by sending the SP ZP CSI-RS Resource Set Activation/Deactivation MAC CE described in clause 6.1.3.19. The configured Semi-persistent ZP CSI-RS resource sets are initially deactivated upon configuration and after a handover.

The MAC entity shall:

1> if the MAC entity receives an SP ZP CSI-RS Resource Set Activation/Deactivation MAC CE on a Serving Cell:

2> indicate to lower layers the information regarding the SP ZP CSI-RS Resource Set Activation/Deactivation MAC CE.

FIG.10B

6.1.3.XX    Extended PUCCH spatial relation Activation/Deactivation MAC CE

The Extended PUCCH spatial relation Activation/Deactivation MAC CE is identified by a MAC subheader with LCID as specified in Table 6.2.1-1. It has a fixed size of 16 bits with following fields:

- Serving Cell ID: This field indicates the identity of the Serving Cell for which the MAC CE applies. The length of the field is 5 bits;

- BWP ID: This field indicates a UL BWP for which the MAC CE applies as the codepoint of the DCI *bandwidth part indicator* field as specified in TS 38.212 [9]. The length of the BWP ID field is 2 bits;

- PUCCH Resource Group ID:   This field contains an identifier of the PUCCH resource group identified by *PUCCH-ResourceGroupId* as specified in TS 38.331 [5]. The length of the field is 2 bits.

- PUCCH Spatial Relation Information ID: This field indicates an activated PUCCH Spatial Relation Information for all the PUCCH resources belonging to the PUCCH resource group indicated by the field of PUCCH Resource Group ID. The field of activated PUCCH Spatial Relation Information is 6 bits and indicated by *PUCCH-SpatialRelationInfoId-r16* as specified in TS 38.331 [5] .;

- R: Reserved bit, set to 0.

TERMINAL AND COMMUNICATION METHOD

FIELD OF THE INVENTION

The present invention relates to a terminal and a communication method in a wireless communication system.

BACKGROUND OF THE INVENTION

Regarding NR (New Radio) (also referred to as "5G"), or a successor system to LTE (Long Term Evolution), technologies have been discussed which satisfy the following requirements: a high capacity system, high data transmission rate, low delay, simultaneous connection of multiple terminals, low cost, power saving, etc.

In a wireless communication system such as NR, a terminal (which may be referred to as a UE or a user apparatus) transmits an SRS (Sounding Reference Signal) to a base station apparatus in order for the base station apparatus to determine radio quality of UL (uplink).

In NR, when spatial relation between: a reference signal (RS), which is a reference to SS/PBCH block, CSI-RS, or the like; and a target SRS, is configured to the terminal, the terminal transmits the SRS using an uplink beam (UL beam) corresponding to the spatial relation (Non-Patent Documents 1 and 2).

CITATION LIST

Non-Patent Document

[Non-Patent Document 1] 3GPP TS 38.214 V15.6.0 (2019 June)
[Non-Patent Document 2] 3GPP TS 38.331 V15.6.0 (2019 June)
[Non-Patent Document 3] 3GPP TS 38.321 V15.6.0 (2019 June)

SUMMARY OF THE INVENTION

Technical Problem

In 3GPP Release 16 (Release-16), technical specifications for MIMO (Multi-Input and Multi-Output) using a plurality of TRPs (Transmission Reception Points) or panels are being developed. Specifically, MIMO is performed between TRPs configured on different sites. In the above technical specification development, discussions are performed regarding activation of a different spatial relation for different PUCCH (Physical Uplink Control Channel) resource for each TRP. Here, "TRPs configured on different sites" refers to TRPs or panels that are installed differently in terms of spatial aspect, physical aspect, locational aspect, positional aspect, or geographical aspect.

However, 3GPP Release 15 (Release-15) assumes a single TRP (that is, antennas are all on the same site), and a PUCCH resource and its spatial relation are also configured to the single TRP. When the specifications of release 15 are applied to multiple TRP environments of release 16, the same PUCCH resource and spatial relation are applied to all TRPs. The spatial relation may be used to indicate, by using a downlink reference signal, an uplink beam used to transmit PUCCH, and thus, the spatial relation may be different for a TRP at a different site. Accordingly, if the same spatial relation is applied to the TRP at a different site, the uplink beam used for transmitting PUCCH may fail to be an optimal beam, the PUCCH may fail to reach the base station apparatus, and may fail to be received by the base station apparatus.

The present invention has been made in view of the above, and it is an object of the present invention to provide a technique that enables to configure a PUCCH for each of TRPs at different sites.

Solution to Problem

According to the disclosed technique, a terminal is provided that includes a reception unit configured to receive resource information of an uplink transmission, the resource information including spatial relation information; and a setting unit configured to perform configuration related to the uplink transmission, in accordance with the resource information of the uplink transmission, the resource information including the spatial relation information. The spatial relation information of the resource information of the uplink transmission may be activated or deactivated.

Advantageous Effects of Invention

According to the disclosed technique, a technique is provided that enables to configure a PUCCH for each of TRPs at different sites.

BRIEF DESCRIPTION OF THE DRAWINGS

FIG. 3A is a drawing illustrating an example of a specification change for RRC (Proposal 1).
FIG. 3B is a drawing illustrating an example of a specification change for RRC (Proposal 1).
FIG. 3C is a drawing illustrating an example of a specification change for RRC (Proposal 1).
FIG. 3D is a drawing illustrating an example of a specification change for RRC (Proposal 1).
FIG. 3E is a drawing illustrating an example of a specification change for RRC (Proposal 1).
FIG. 3F is a drawing illustrating an example of a specification change for RRC (Proposal 1).
FIG. 3H is a drawing illustrating an example of a specification change for RRC (Proposal 1).
FIG. 4A is a drawing illustrating an example of a specification change for RRC (Proposal 2).
FIG. 4B is a drawing illustrating an example of a specification change for RRC (Proposal 2).
FIG. 4C is a drawing illustrating an example of a specification change for RRC (Proposal 2).
FIG. 4D is a drawing illustrating an example of a specification change for RRC (Proposal 2).
FIG. 4E is a drawing illustrating an example of a specification change for RRC (Proposal 2).
FIG. 4F is a drawing illustrating an example of a specification change for RRC (Proposal 2).
FIG. 4G is a drawing illustrating an example of a specification change for RRC (Proposal 2).
FIG. 4H is a drawing illustrating an example of a specification change for RRC (Proposal 2).

FIG. 5A is a drawing illustrating an example of a specification change for RRC (Proposal 3).

FIG. 5B is a drawing illustrating an example of a specification change for RRC (Proposal 3).

FIG. 5C is a drawing illustrating an example of a specification change for RRC (Proposal 3).

FIG. 5D is a drawing illustrating an example of a specification change for RRC (Proposal 3).

FIG. 5E is a drawing illustrating an example of a specification change for RRC (Proposal 3).

FIG. 5F is a drawing illustrating an example of a specification change for RRC (Proposal 3).

FIG. 6A is a drawing illustrating an example of a specification change for RRC (Proposal 4).

FIG. 6B is a drawing illustrating an example of a specification change for RRC (Proposal 4).

FIG. 6C is a drawing illustrating an example of a specification change for RRC (Proposal 4).

FIG. 6D is a drawing illustrating an example of a specification change for RRC (Proposal 4).

FIG. 6E is a drawing illustrating an example of a specification change for RRC (Proposal 4).

FIG. 6F is a drawing illustrating an example of a specification change for RRC (Proposal 4).

FIG. 6H is a drawing illustrating an example of a specification change for RRC (Proposal 4).

FIG. 7A is a drawing illustrating an example of a specification change for MAC CE (Proposal 1).

FIG. 7B is a drawing illustrating an example of a specification change for MAC CE (Proposal 1).

FIG. 8A is a drawing illustrating an example of a specification change for MAC CE (Proposal 2).

FIG. 8B is a drawing illustrating an example of a specification change for MAC CE (Proposal 2).

FIG. 8C is a drawing illustrating an example of a specification change for MAC CE (Proposal 2).

FIG. 9A is a drawing illustrating an example of a specification change for MAC CE (Proposal 3).

FIG. 9B is a drawing illustrating an example of a specification change for MAC CE (Proposal 3).

FIG. 10A is a drawing illustrating an example of a specification change for MAC CE (Proposal 4).

FIG. 10B is a drawing illustrating an example of a specification change for MAC CE (Proposal 4).

DETAILED DESCRIPTION OF THE PREFERRED EMBODIMENTS

Figure 1:
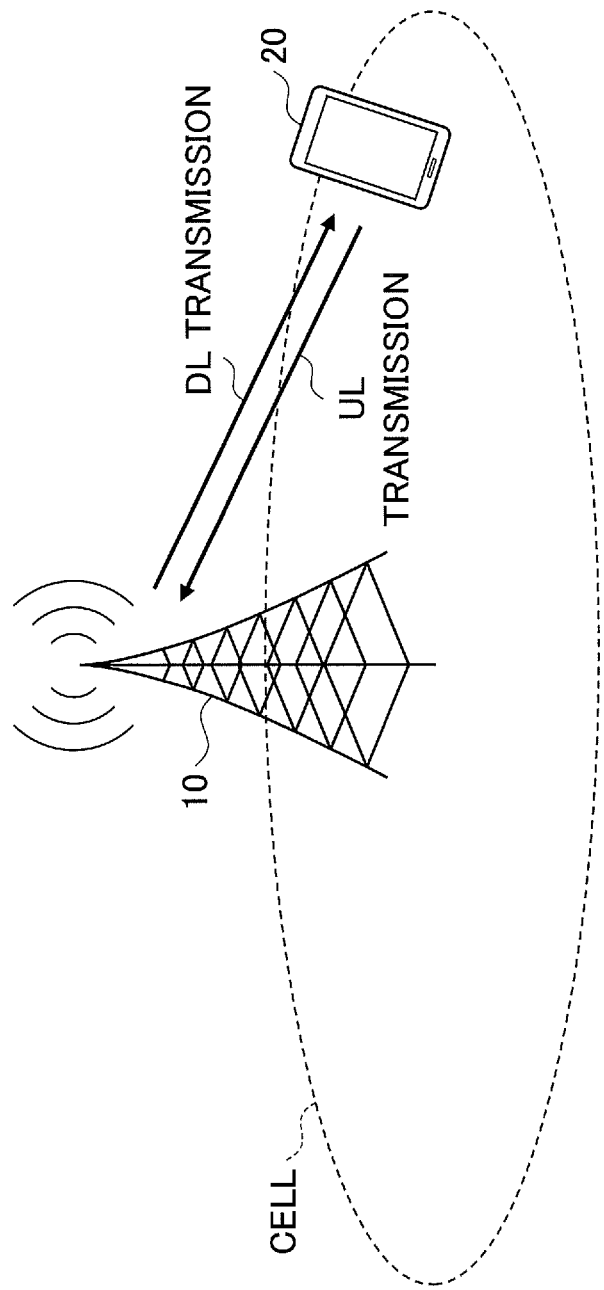
FIG. 1 is a drawing illustrating a wireless communication system according to an embodiment of the present invention.

In the following, referring to the drawings, one or more embodiments of the present invention will be described. It should be noted that the embodiments described below are examples. Embodiments of the present invention are not limited to the following embodiments.

In operations of a wireless communication system according to an embodiment of the present invention, conventional techniques will be used appropriately. A conventional technique is a conventional NR. That is, although the base station apparatus 10 and the terminal 20 described below basically operate according to the conventional NR specifications, with respect to operations relating to the present invention, the base station apparatus 10 and the terminal 20 perform operations modified from the operations according to the conventional NR specifications. Note that the present invention may be applicable not only to NR but also to any wireless communication system.

Furthermore, in an embodiment of the present invention, the duplex scheme may be TDD (Time Division Duplexing), FDD (Frequency Division Duplexing), or other schemes (e.g., Flexible Duplex, or the like).

Further, in an embodiment of the present invention, the expression, a radio parameter, and the like, are "configured" may mean that a predetermined value is pre-configured, or may mean that a radio parameter indicated by the base station apparatus 10 or the terminals 20 is configured.

(System Configuration)

FIG. 1 is a drawing illustrating a wireless communication system according to an embodiment of the present invention. As illustrated in FIG. 1, a wireless communication system according to an embodiment of the present invention includes a base station apparatus 10 and a terminal 20. In FIG. 1, a single base station apparatus 10 and a single terminal 20 are illustrated as an example. There may be a plurality of base stations 10 and a plurality of terminals 20.

The base station apparatus 10 is a communication apparatus that provides one or more cells and performs wireless communications with the terminal 20. Physical resources of the radio signal may be defined in the time domain and the frequency domain, the time domain may be defined by the number of OFDM symbols, and the frequency domain may be defined by the number of sub-carriers or resource blocks. The base station apparatus 10 transmits a synchronization signal, system information, and the like, to the terminal 20. The synchronization signal is, for example, an NR-PSS and an NR-SSS. The system information may be referred to as broadcast information.

As shown in FIG. 1, the base station apparatus 10 transmits control information or data in DL (Downlink) to the terminal 20 and receives control information or data in UL (Uplink) from the terminal 20. The base station apparatus 10 and terminal 20 are capable of transmitting and receiving a signal by performing beamforming. Further, the base station apparatus 10 and the terminal 20 can both apply MIMO (Multiple Input Multiple Output) communication to DL or UL. Further, both the base station apparatus 10 and terminal 20 may perform communications via an SCell (Secondary Cell) and a PCell (Primary Cell) using CA (Carrier Aggregation).

The terminal 20 may be a communication apparatus that includes a wireless communication function, such as a smart-phone, a mobile phone, a tablet, a wearable terminal, a communication module for M2M (Machine-to-Machine), or the like. As shown in FIG. 1, the terminal 20 uses various communication services provided by the wireless communication system by receiving control information or data in DL from the base station apparatus 10 and transmitting control information or data in UL to the base station apparatus 10.

Figure 2:
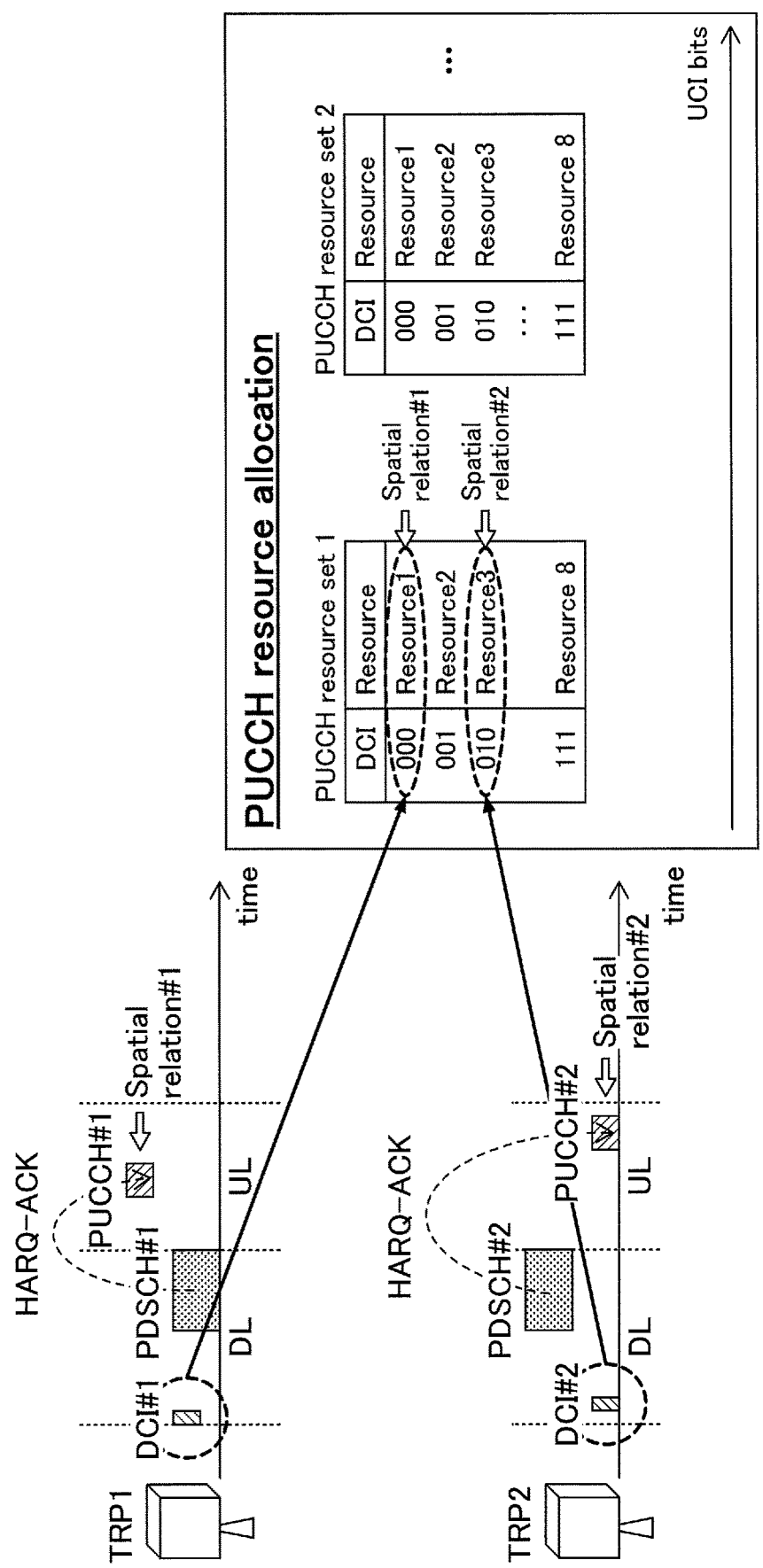
FIG. 2 is a drawing illustrating the activation of different spatial relations for different PUCCH resources for each TRP.
Figure 3G:
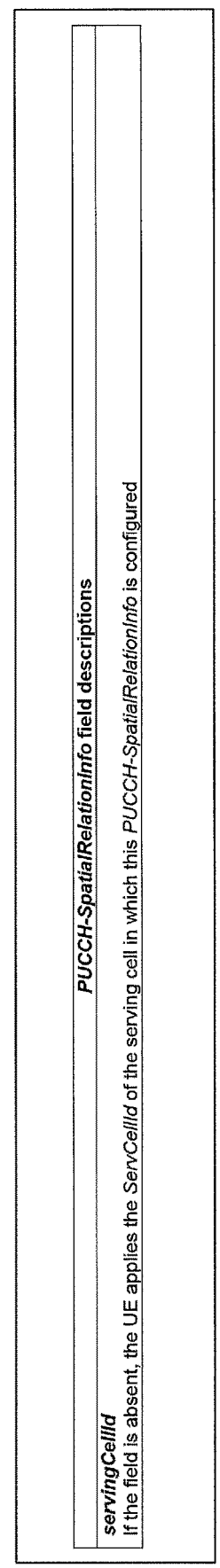
FIG. 3G is a drawing illustrating an example of a specification change for RRC (Proposal 1).
Figure 6G:
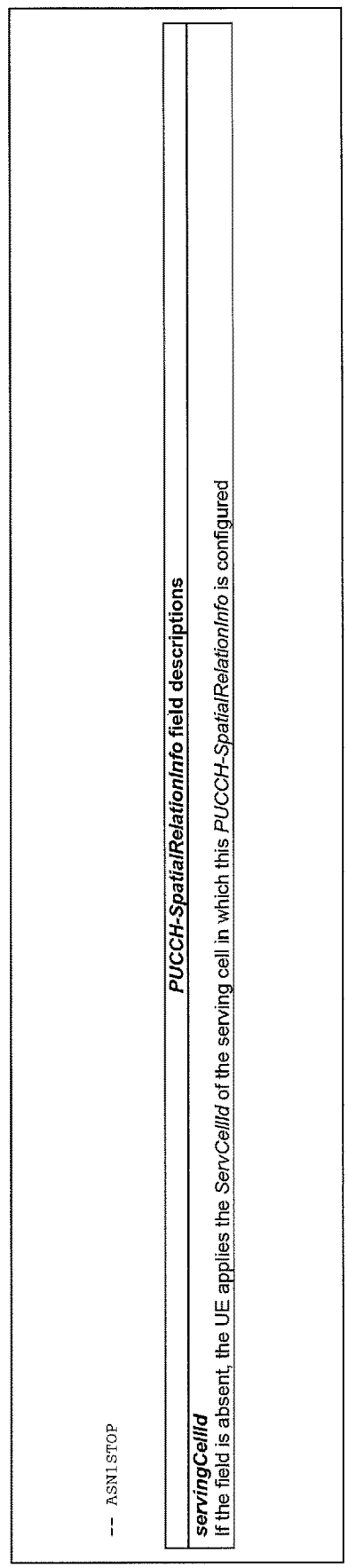
FIG. 6G is a drawing illustrating an example of a specification change for RRC (Proposal 4).

FIG. 2 is a drawing illustrating activation of different spatial relations for different PUCCH resources for each TRP. As shown in FIG. 2, in release 16, activation of different spatial relations (e.g., spatial relation 1 and spatial relation 2) for different PUCCH resources (e.g., resource 1 and resource 2) has been discussed. In other words, the spatial relation 1 is activated for the resource 1 at TRP 1, and the spatial relation 2 is activated for the resource 2 at TRP 2.

In 3GPP release 15 (Release-15), a single TRP (that is, antennas are all at the same site) is assumed, and thus, a PUCCH resource and its spatial relation are also configured only to the single TRP. When the above-described specifications of release 15 are applied to multiple TRP environments of release 16, the same PUCCH resource and its spatial relation are applied to all TRPs. However, the spatial relation may be used to indicate, by using a downlink reference signal, an uplink beam used for transmitting PUCCH, and thus, the spatial relations may be different for a TRP at a different site. Accordingly, if the same spatial relation is applied to the TRP on the different site, the uplink beam used for transmitting PUCCH may fail to be an optimal beam, the PUCCH may fail to reach the base station apparatus, and may fail to be received by the base station apparatus.

First Embodiment

In a first embodiment of the present invention, a method for configuring PUCCH resources for each of TRPs at different sites is considered, in which grouping is applied to PUCCH resources for each TRP.

(Proposal 1) A PUCCH resource group ID may be configured for each PUCCH resource in a PUCCH resource set. Each PUCCH resource group ID may correspond to each TRP.

(Proposal 2) A PUCCH resource group ID may be configured for each PUCCH resource in a common resource pool (common pool).

(Proposal 3) PUCCH resource sets #0, #1, #2, and #3 may be configured for each TRP.

(Proposal 4) PUCCH-Config itself may be configured for each TRP.

(Specification Change Example for RRC)

FIGS. 3A to 3H are drawings illustrating an example of a specification change for RRC (proposal 1).

It is illustrated in an example included in FIGS. 3A to 3H that the PUCCH-Config information element includes: up to the maximum number of PUCCH resource sets (maxNrofPUCCH-ResourceSets) of PUCCH-ResourceSet-v16xys; and up to the maximum number of spatial relation information items (maxNrofSpatialRelationInfos-r16) of PUCCH-SpatialRelationInfoExt-r16s. It is illustrated that the parameter PUCCH-ResourceSet-v16xy, corresponding to each PUCCH resource set, includes PUCCH resource group IDs corresponding to respective PUCCH resources. It is illustrated that the maximum number of spatial relation information items per BWP in a cell (maxNrofSpatialRelationInfos-r16) is 64. It is possible to configure a PUCCH resource for each of TRPs at different sites, by associating each PUCCH resource group ID with each TRP. Note that, although 64 is described as the maximum number, the maximum number is not limited to this value, and may be any value as long as it is appropriate in the present invention.

Note that the name of PUCCH resource group ID is a name corresponding to a TRP index indicating each TRP, and, may be referred to as any name including PUCCH resource group index, RS group ID, antenna port group ID, CORESET group ID, ID/index configured by an upper layer, etc. Note that, with respect to CORESET group ID, it is assumed in 3GPP release 16 that CORESET is configured for each TRP, and, for example, TRP1 may be associated with CORESETs #0, #1, and #2, and TRP2 may be associated with CORESETs #3 and #4, by an upper layer For example, CORESETs #0, #1, and #2 may be associated with "CORESET group ID=0", and CORESETs #3 and #4 may be associated with "CORESET group ID=1".

Because a DMRS (Dedicated Demodulation Reference Signal) sequence is generated by a Sequence ID configured for each CORESET, if a different Sequence ID is configured for each CORESET, it is possible for the terminal 20 to determine, when DCI (Downlink Control Information) is detected, which CORESET the DCI is associated with, and which CORESET group ID the DCI is associated with.

FIGS. 4A to 4H are drawings illustrating an example of a specification change for RRC (proposal 2).

It is illustrated in an example included in FIGS. 4A to 4H that PUCCH resource group ID (PUCCH-ResourceGroupID-r16) is configured for each PUCCH resource (PUCCH-Resource-v16xy). It is possible to configure a PUCCH resource for each of TRPs on different sites, by associating each PUCCH resource group ID with each TRP.

FIGS. 5A to 5F are drawings illustrating an example of a specification change for RRC (proposal 3).

As illustrated in the example included in FIGS. 5A to 5F, the PUCCH-Config information element includes up to the maximum number of TRPs (maxNrofTRPs) PUCCH resource set configurations (PUCCH-ResourceSetConfig-r16s). Further, it is illustrated that the PUCCH resource set configuration (PUCCH-ResourceSetConfig-r16), corresponding to each TRP, includes up to the maximum number of PUCCH resource sets (maxNrofPUCCH-ResourceSets) PUCCH-ResourceSets. For example, the PUCCH resource set configuration, corresponding to TRP1, may include PUCCH-ResourceSets #0, #1, #2, and #3. In this way, it is possible to configure a PUCCH resource for each of TRPs on different sites.

FIGS. 6A to 6H are drawings illustrating an example of a specification change for RRC (proposal 4).

It is illustrated in an example in FIGS. 6A to 6H that the BWP-UplinkDedicated information element includes up to the maximum number of TRPs (maxNrofTRPs) PUCCH-Configs. In other words, it is illustrated that the PUCCH-Config can be configured for each TRP. In this way, it is possible to configure a PUCCH resource for each of TRPs on different sites.

Second Embodiment

In a second embodiment of the present invention, a method for activating/deactivating a PUCCH resource configured for each of TRPs on different sites, in which, for the PUCCH resource that is configured according to the first Embodiment for each TRP, the spatial relation of the PUCCH resource is activated/deactivated in a unit of TRP by using MAC (Media Access Control) CE (Control Element).

(Proposal 1) 10 octet PUCCH spatial relation activation/deactivation MAC CE may be newly defined, and a 64-bit bitmap may be provided. By using 64 bits, the spatial relation to be activated is configured to 1, and the spatial relation to be deactivated is configured to 0. The 64-bit bitmap may be configured individually for each PUCCH resource group, and the PUCCH resource group may be specified by ID. Note that the Proposal 1 can correspond to a case of up to two TRPs. Note that, although 64 is described as the number of bits, the number of bits is not limited to this value, and may be any value as long as it is appropriate in the present invention.

(Proposal 2) A new MAC CE may be defined, and the MAC CE may be used to specify the PUCCH resource group ID to be activated/deactivated by a bitmap after a serving cell ID and a BWP ID, and then, specify the PUCCH resource ID and the spatial relation information to be activated/deactivated by a bitmap in the ascending order of the PUCCH resource group ID. Note that the Proposal 2 can correspond to a case of up to eight TRPs.

(Proposal 3) A new MAC CE may be defined, and the MAC CE may include, after the serving cell ID and the BWP ID, the PUCCH resource ID for which the spatial relation is to be activated, the PUCCH resource group ID to which the PUCCH resource belongs, and the spatial relation information ID.

(Proposal 4) A new MAC CE may be defined, and the MAC CE may include, after the serving cell ID and the BWP ID, the PUCCH resource ID for which the spatial relation is to be activated, and the spatial relation information ID. In the Proposal 4, the same spatial relation information is applied to all PUCCH resources that belong to the same PUCCH resource group.

(Specification Change Example for MAC CE)

FIGS. 7A to 7B are drawings illustrating an example of a specification change for MAC CE (Proposal 1).

It is illustrated in an example in FIGS. 7A to 7B that 10 octet PUCCH spatial relation activation/deactivation MAC CE is newly defined, and a 64-bit bitmap is provided. The 10 octet PUCCH spatial relation activation/deactivation MAC CE includes a one-bit Gr, and a 64-bit bitmap $S_0$-$S_{63}$. "Gr=0" corresponds to "PUCCH resource group ID=0", and "Gr=1" corresponds to "PUCCH resource group ID=1". "Si=0 (i=0 to 63)" indicates that the corresponding PUCCH spatial relation is to be activated, and "Si=1 (i=0 to 63)" indicates that the corresponding PUCCH spatial relation is to be deactivated. For example, "PUCCH resource group ID=0, 1" may be associated with TRP1 and TRP2, respectively. In this way, it is possible to activate/deactivate the PUCCH resource configured for each of TRPs on different sites. Note that, although 64 is described as the number of bits, the number of bits is not limited to this value, and may be any value as long as it is appropriate in the present invention.

FIGS. 8A to 8C are drawings illustrating an example of a specification change for MAC CE (Proposal 2).

In FIGS. 8A to 8C, a multiple entry PUCCH spatial relation Activation/Deactivation MAC CE is illustrated as an example of the new MAC CE. With respect to the new MAC CE: the size is variable; the serving cell ID and BWP ID are configured to the first octet; PUCCH resource group IDs to be activated/deactivated are specified by the bitmap Gr0-Gr7 in the second octet; and in the third and the following octets, sets of a PUCCH resource group ID and a PUCCH spatial relation information ID are configured as many as the number of PUCCH resource group IDs to be activated/deactivated. The maximum number of PUCCH resource group IDs to be activated/deactivated is 8. It is possible to correspond to cases of up to 8 TRPs, by associating TRPs with PUCCH resource groups.

Figure 9C:
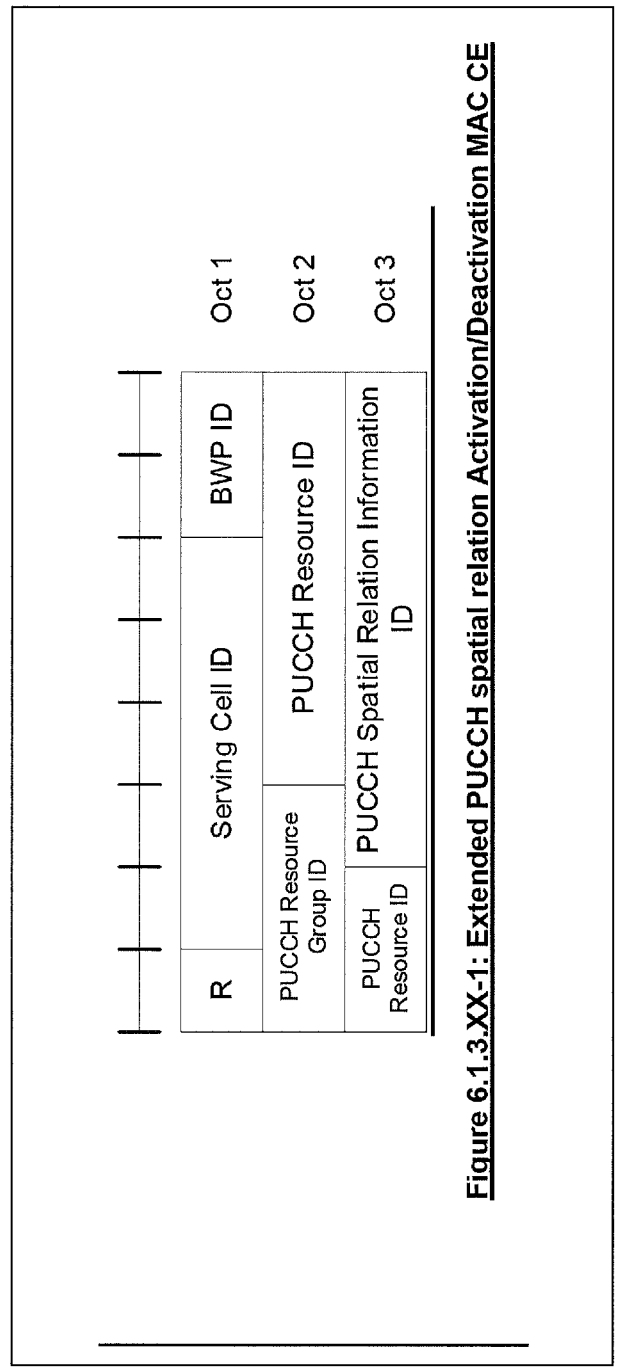
FIG. 9C is a drawing illustrating an example of a specification change for MAC CE (Proposal 3).

FIGS. 9A to 9C are drawings illustrating an example of a specification change for MAC CE (Proposal 3).

In FIGS. 9A to 9C, an Extended PUCCH spatial relation Activation/Deactivation MAC CE is illustrated as an example of the new MAC CE. With respect to the new MAC CE: the size is fixed at 24 bits; a serving cell ID and a BWP ID are configured to the first octet; a 3-bit PUCCH resource group ID, a 7-bit PUCCH resource ID, and a 6-bit PUCCH spatial relation information ID are configured to the second and third octets.

Figure 10C:
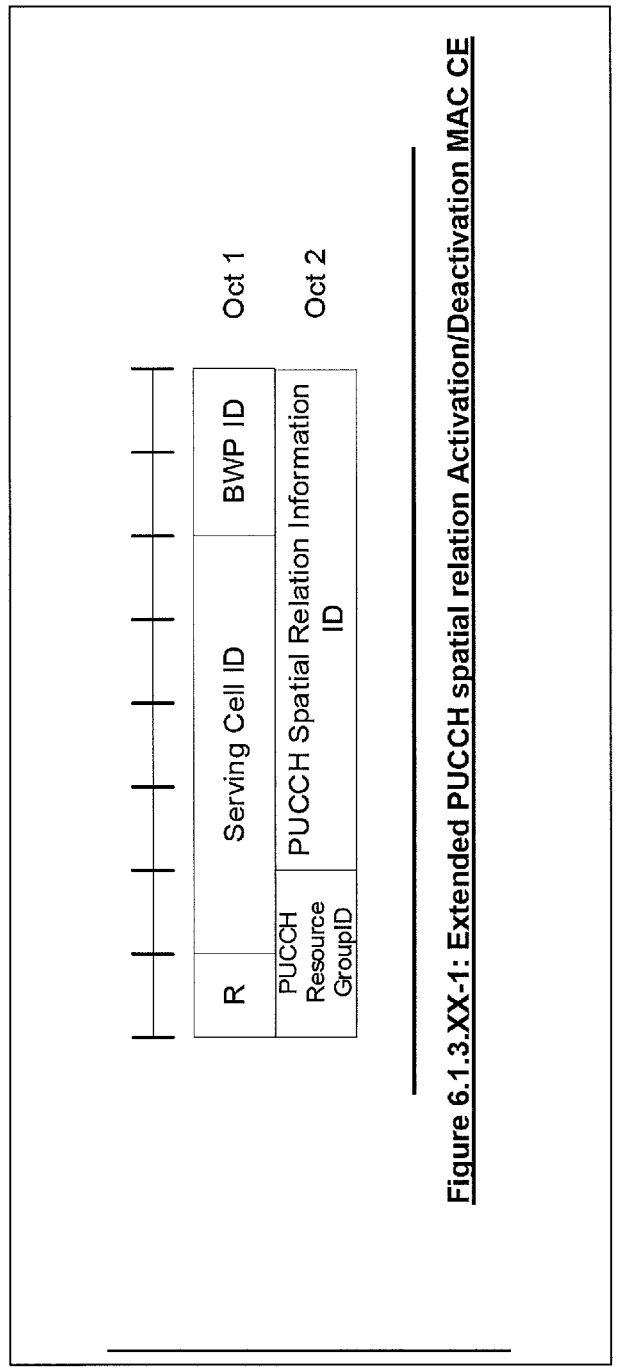
FIG. 10C is a drawing illustrating an example of a specification change for MAC CE (Proposal 4).

FIGS. 10A to 10C are drawings illustrating an example of a specification change for MAC CE (Proposal 4).

In FIGS. 10A to 10C, an Extended PUCCH spatial relation Activation/Deactivation MAC CE is illustrated as an example of the new MAC CE. With respect to the new MAC CE: the size is fixed at 16 bits; a serving cell ID and a BWP ID are configured to the first octet; a 2-bit PUCCH resource group ID and a 6-bit PUCCH spatial relation information ID are configured to the second octet. Here, the PUCCH spatial relation information ID corresponds to all PUCCH resources that belong to the PUCCH resource group indicated by the 2-bit PUCCH resource group ID.

(Apparatus Configuration)

Next, a functional configuration example of the base station apparatus 10 and the terminal 20 for performing the processes and operations described above will be described. The base station apparatus 10 and terminal 20 include functions for implementing the first embodiment and the second embodiment described above. It should be noted, however, that each of the base station apparatus 10 and the terminal 20 may include functions for only one of the first embodiment and the second embodiment.

<Base Station Apparatus 10>

Figure 11:
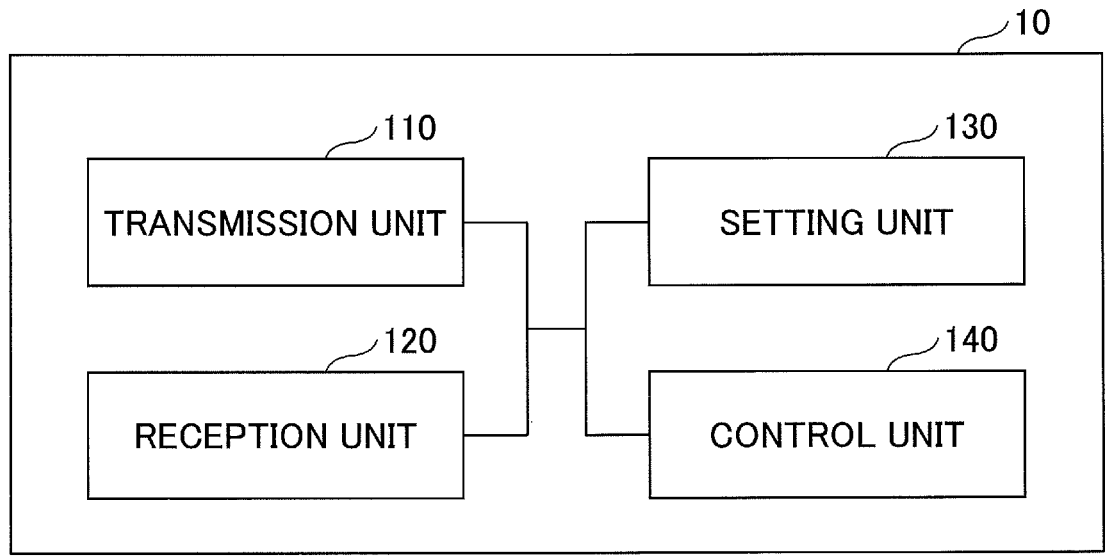
FIG. 11 is drawing illustrating an example of the functional structure of a base station apparatus 10 according to an embodiment of the present invention.

FIG. 11 is a drawing illustrating an example of a functional structure of a base station apparatus 10. As illustrated in FIG. 11, the base station apparatus 10 includes a transmission unit 110, a reception unit 120, a configuration unit (setting unit) 130, and a control unit 140. The functional structure illustrated in FIG. 11 is merely an example. Functional divisions and names of functional units may be anything as long as it can perform operations according to an embodiment of the present invention. Further, the transmission unit 110 and the reception unit 120 may be combined and may be referred to as a communication unit.

The transmission unit 110 includes a function for generating a signal to be transmitted to the terminal 20 side and transmitting the signal wirelessly. The reception unit 120 includes a function for receiving various signals transmitted from the terminal 20 and acquiring, for example, information of a higher layer from the received signals. Further, the transmission unit 110 has a function to transmit NR-PSS, NR-SSS, NR-PBCH, DL/UL control signals, DCI via PDCCH, data via PDSCH, and the like, to the terminal 20.

The configuration unit 130 stores preset configuration information and various configuration information items to be transmitted to the terminal 20 in a storage device included in the setting unit 130 and reads the preset configuration information from the storage apparatus if necessary. Contents of the configuration information are, for example, a communication configuration related to scheduling of the terminal 20, configuration information for UE capability and SRS, etc.

The control unit 140 performs scheduling of the terminal 20 for DL reception or UL transmission, via the transmission unit 110. The functional units related to signal transmission in the control unit 140 may be included in the transmission unit 110, and the functional units related to signal reception in the control unit 140 may be included in the reception unit 120. Further, the transmission unit 110 may be referred to as a transmitter, and the reception unit 120 may be referred to as a receiver.

For example, the transmission unit 110 transmits the configuration information specifying one or more sounding reference signal resources to the terminal and further transmits the spatial relation information for the one or more sounding reference signal resources to the terminal via at least one of a MAC control element and an RRC message. The spatial relation information includes, for example, information related to a PUCCH resource for each of TRPs on different sites. The grouping may be applied to the PUCCH resource for each TRP. In addition, the spatial relation information may have the following features.

(1) PUCCH resource group ID may be configured for each PUCCH resource in the PUCCH resource set. Each PUCCH resource group ID may correspond to each TRP.

(2) PUCCH resource group ID may be configured for each PUCCH resource in a common resource pool (common pool).

(3) PUCCH resource sets #0, #1, #2, and #3 may be configured for each TRP.

(4) PUCCH-Config itself may be configured for each TRP.

Further, for example, the transmission unit 110 transmits to the terminal a configuration information specifying one or more sounding reference signal resources and a list including one or more items of spatial relation information applicable to the one or more sounding reference signal resources, and further transmits to the terminal a sounding reference signal resource and spatial relation information, included in the list, that is applied to the sounding reference signal, via at least one of a MAC control element and an RRC message.

<Terminal 20>

Figure 12:
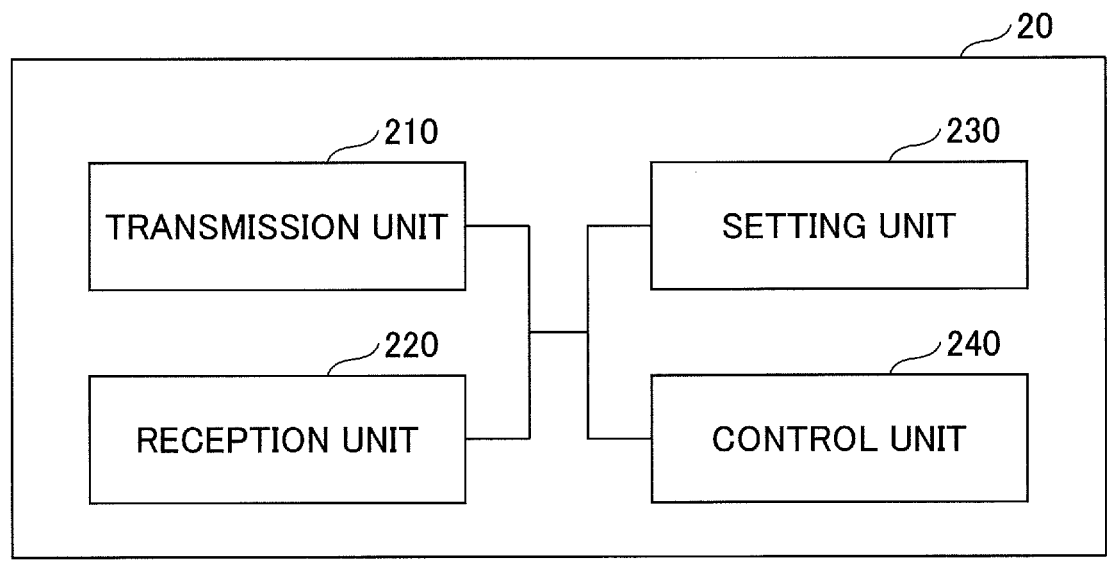
FIG. 12 is drawing illustrating an example of the functional structure of a terminal 20 according to an embodiment of the present invention.

FIG. 12 is a diagram illustrating an example of a functional configuration of the terminal 20. As shown in FIG. 12, the terminal 20 includes a transmission unit 210, a reception unit 220, a configuration unit 230, and a control unit 240. The functional structure illustrated in FIG. 12 is merely an example. Functional divisions and names of functional units may be anything as long as it can perform operations according to an embodiment of the present invention. The transmission unit 210 and the reception unit 220 may be combined and may be referred to as a communication unit.

The transmission unit 210 generates a transmission signal from transmission data and transmits the transmission signal wirelessly. The reception unit 220 receives various signals wirelessly and obtains upper layer signals from the received physical layer signals. Further, the reception unit 220 has a function for receiving NR-PSS, NR-SSS, NR-PBCH, DL/UL/SL control signals, DCI via PDCCH, data via PDSCH, etc., transmitted from the base station apparatus 10. Further, for example, with respect to the D2D communications, the transmission unit may transmit, to another terminal 20, PSCCH (Physical Sidelink Control Channel), PSSCH (Physical Sidelink Shared Channel), PSDCH (Physical Sidelink Discovery Channel), PSBCH (Physical Sidelink Broadcast Channel), etc., and the reception unit 120 may receive, from the another terminal 20, PSCCH, PSSCH, PSDCH, or PSBCH.

The setting unit 230 stores various configuration information items received from the base station apparatus 10 or the terminal 20 by the reception unit 220 in the storage device included in the setting unit 230, and reads them from the storage device as necessary. Further, the setting unit 230 also stores pre-configured configuration information. Contents of the configuration information are, for example, configuration information related to UE capability and SRS.

The control unit 240 controls the terminal 20. The functional units related to signal transmission in the control unit 240 may be included in the transmission unit 210, and the functional units related to signal reception in the control unit 240 may be included in the reception unit 220. Further, the transmission unit 210 may be referred to as a transmitter, and the reception unit 220 may be referred to as a receiver. Note that the activation or the deactivation of the spatial relation information (to be applied to the uplink transmission resource, or the like) may be performed by the setting unit 230 or the control unit 240, or may be performed by a different functional unit.

For example, the reception unit 220 receives configuration information specifying one or more sounding reference signal resources from the base station apparatus, and receives spatial relation information for the one or more sounding reference signal resources from the base station apparatus via at least one of a MAC control element and an RRC message. The spatial relation information includes, for example, information related to a PUCCH resource for each of TRPs on different sites. The grouping may be applied to the PUCCH resource for each TRP. In addition, the spatial relation information may have the following features.

(1) PUCCH resource group ID may be configured for each PUCCH resource in the PUCCH resource set. Each PUCCH resource group ID may correspond to each TRP.

(2) PUCCH resource group ID may be configured for each PUCCH resource in a common resource pool (common pool).

(3) PUCCH resource sets #0, #1, #2, and #3 may be configured for each TRP.

(4) PUCCH-Config itself may be configured for each TRP.

The transmission unit 210 transmits the sounding reference signal by using a spatial domain transmission filter corresponding to the spatial relation information.

Further, for example, the reception unit 220 receives from the base station apparatus configuration information specifying one or more sounding reference signal resources and one or more spatial relation information applicable to the one or more sounding reference signal resources, and receives from the base station apparatus a sounding reference signal resource and spatial relation information, in the list, that is applied to the sounding reference signal resource via at least one of a MAC control element and an RRC message. The transmission unit 210 transmits the sounding reference signal by using a spatial domain transmission filter corresponding to the spatial relation information.

(Hardware Structure)

In the above functional structure diagrams used for describing an embodiment of the present invention (FIG. 11 and FIG. 12), functional unit blocks are shown. The functional blocks (function units) are realized by a freely-selected combination of hardware and/or software. Further, realizing means of each functional block is not limited in particular. In other words, each functional block may be realized by a single apparatus in which multiple elements are coupled physically and/or logically, or may be realized by two or more apparatuses that are physically and/or logically separated and are physically and/or logically connected (e.g., wired and/or wireless). The functional blocks may be realized by combining the above-described one or more apparatuses with software.

Functions include, but are not limited to, judging, determining, calculating, processing, deriving, investigating, searching, checking, receiving, transmitting, outputting, accessing, resolving, selecting, establishing, comparing, assuming, expecting, and deeming; broadcasting, notifying, communicating, forwarding, configuring, reconfiguring, allocating, mapping, and assigning, etc. For example, a functional block (component) that functions to transmit is called a transmitting unit or a transmitter. In either case, as described above, the implementation method is not particularly limited.

Figure 13:
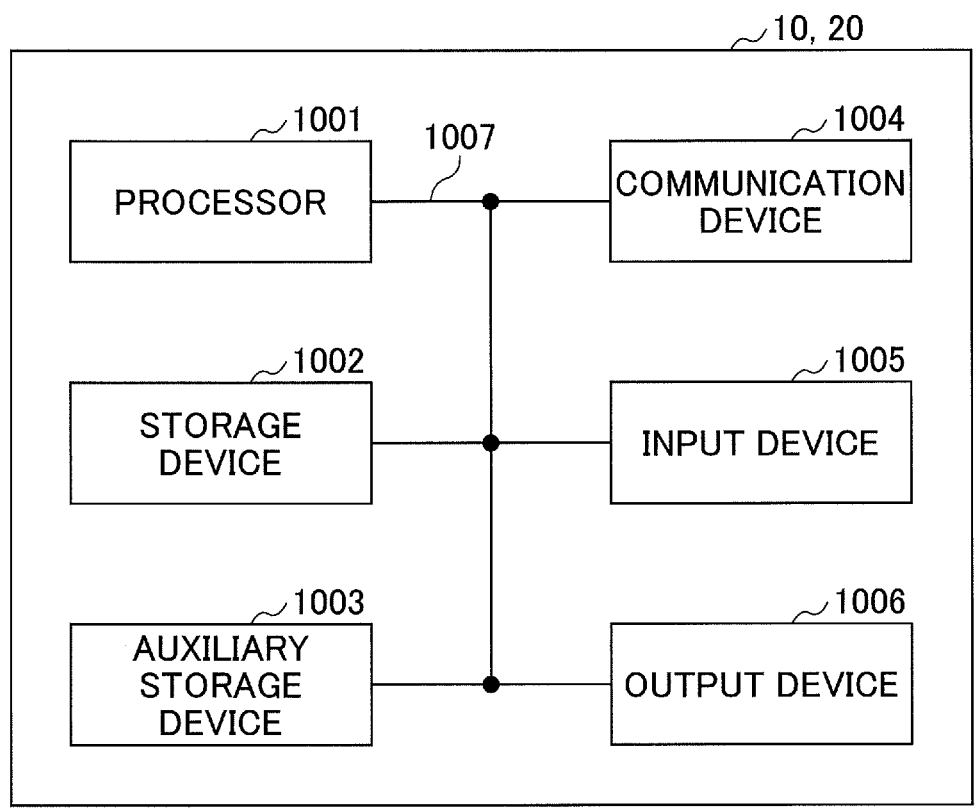
FIG. 13 is a drawing illustrating an example of the hardware structure of a base station apparatus 10 or a terminal 20 according to an embodiment of the present invention.

For example, the base station apparatus 10, terminal 20, etc., according to an embodiment of the present disclosure may function as a computer for processing the radio communication method of the present disclosure. FIG. 13 is a drawing illustrating an example of hardware structures of the base station apparatus 10 and the terminal 20 according to an embodiment of the present invention. The above-described base station apparatus 10 and the terminal 20 may be physically a computer device including a processor 1001, a storage device 1002, an auxiliary storage device 1003, a communication device 1004, an input device 1005, an output device 1006, a bus 1007, etc.

It should be noted that, in the descriptions below, the term "apparatus" can be read as a circuit, a device, a unit, etc. The hardware structures of the base station apparatus 10 and terminal 20 may include one or more of each of the devices illustrated in the figure, or may not include some devices.

Each function in the base station apparatus 10 and terminal 20 is implemented by having the processor 1001 perform an operation by reading predetermined software (programs) onto hardware such as the processor 1001 and the storage device 1002, and by controlling communication by the communication device 1004 and controlling at least one of reading and writing of data in the storage device 1002 and the auxiliary storage device 1003.

The processor 1001 controls the entire computer by, for example, controlling the operating system. The processor 1001 may include a central processing unit (CPU) including an interface with a peripheral apparatus, a control apparatus, a calculation apparatus, a register, etc. For example, the above-described control unit 140, control unit 240, and the like, may be implemented by the processor 1001.

Further, the processor 1001 reads a program (program code), a software module, or data from the auxiliary storage apparatus 1003 and/or the communication apparatus 1004, and performs various processes according to the program, the software module, or the data. As the program, a program is used that causes the computer to perform at least a part of operations according to an embodiment of the present invention described above. For example, the control unit 140 of the base station apparatus 10 illustrated in FIG. 11 may be realized by control programs that are stored in the storage apparatus 1002 and are executed by the processor 1001. Further, for example, the control unit 240 of the terminal 20 illustrated in FIG. 12 may be realized by control programs that are stored in the storage device 1002 and are executed by the processor 1001. The various processes have been described to be performed by a single processor 1001. However, the processes may be performed by two or more processors 1001 simultaneously or sequentially. The processor 1001 may be implemented by one or more chips. It should be noted that the program may be transmitted from a network via a telecommunication line.

The storage apparatus 1002 is a computer-readable recording medium, and may include at least one of a ROM (Read Only Memory), an EPROM (Erasable Programmable ROM), an EEPROM (Electrically Erasable Programmable ROM), a RAM (Random Access Memory), etc. The storage apparatus 1002 may be referred to as a register, a cache, a main memory, etc. The storage apparatus 1002 is capable of storing programs (program codes), software modules, or the like, that are executable for performing communication processes according to an embodiment of the present invention.

The auxiliary storage apparatus 1003 is a computer-readable recording medium, and may include at least one of, for example, an optical disk such as a CD-ROM (Compact Disc ROM), a hard disk drive, a flexible disk, a magneto optical disk (e.g., compact disk, digital versatile disk, Blu-ray (registered trademark) disk), a smart card, a flash memory (e.g., card, stick, key drive), a floppy (registered trademark) disk, a magnetic strip, etc. The above recording medium may be a database including the storage apparatus 1002 and/or the auxiliary storage apparatus 1003, a server, or any other appropriate medium.

The communication apparatus 1004 is hardware (transmission and reception device) for communicating with computers via at least one of a wired network and a wireless network, and may be referred to as a network device, a network controller, a network card, a communication module, etc. The communication apparatus 1004 may comprise a high frequency switch, duplexer, filter, frequency synthesizer, or the like, for example, to implement at least one of frequency division duplexing (FDD) or time division duplexing (TDD). For example, the transmitting/receiving antenna, the amplifier unit, the transmitting/receiving unit, the transmission line interface, and the like, may be implemented by the communication apparatus 1004. The transmitting/receiving unit may be physically or logically divided into a transmitting unit and a receiving unit.

The input apparatus 1005 is an input device that receives an external input (e.g., keyboard, mouse, microphone, switch, button, sensor). The output apparatus 1006 is an output device that outputs something to the outside (e.g., display, speaker, LED lamp). It should be noted that the input device 1005 and the output device 1006 may be integrated into a single device (e.g., touch panel).

Further, the apparatuses including the processor 1001, the storage apparatus 1002, etc., are connected to each other via the bus 1007 used for communicating information. The bus 1007 may include a single bus, or may include different buses between the apparatuses.

Further, the base station apparatus 10 and terminal 20 may include hardware such as a microprocessor, a digital signal processor (DSP), an ASIC (Application Specific Integrated Circuit), a PLD (Programmable Logic Device), a FPGA (Field Programmable Gate Array), etc., and a part or all of each functional block may be implemented by the hardware. For example, the processor 1001 may be implemented by at least one of the above hardware elements.

Supplement of Embodiment

As described above, one or more embodiments have been described. The present invention is not limited to the above embodiments. A person skilled in the art should understand that there are various modifications, variations, alternatives, replacements, etc., of the embodiments. In order to facilitate understanding of the present invention, specific values have been used in the description. However, unless otherwise specified, those values are merely examples and other appropriate values may be used. The division of the described items may not be essential to the present invention. The things that have been described in two or more items may be used in a combination if necessary, and the thing that has been described in one item may be appropriately applied to another item (as long as there is no contradiction). Boundaries of functional units or processing units in the functional block diagrams do not necessarily correspond to the boundaries of physical parts. Operations of multiple functional units may be physically performed by a single part, or an operation of a single functional unit may be physically performed by multiple parts. The order of sequences and flowcharts described in an embodiment of the present invention may be changed as long as there is no contradiction. For the sake of description convenience, the base station apparatus 10 and the terminal 20 have been described by using functional block diagrams. However, the apparatuses may be implemented by hardware, software, or a combination of hardware and software. The software executed by a processor included in a base station apparatus 10 according to an embodiment of the present invention and the software executed by a processor included in a terminal 20 according to an embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate recording medium.

Further, information indication (transmission, notification) may be performed not only by methods described in an aspect/embodiment of the present specification but also a method other than those described in an aspect/embodiment of the present specification. For example, the information transmission may be performed by physical layer signaling (e.g., DCI (Downlink Control Information), UCI (Uplink Control Information)), upper layer signaling (e.g., RRC signaling, MAC signaling, broadcast information (MIB (Master Information Block), SIB (System Information Block))), other signals, or combinations thereof. Further, RRC signaling may be referred to as an RRC message. The RRC signaling may be, for example, an RRC connection setup message, an RRC connection reconfiguration message, or the like.

Each aspect/embodiment described in the present disclosure may be applied to at least one of a system using LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and other appropriate systems, and a next generation system enhanced therefrom. Further, multiple systems may also be applied in combination (e.g., at least one of LTE and LTE-A combined with 5G, etc.).

The order of processing steps, sequences, flowcharts or the like of an aspect/embodiment described in the present specification may be changed as long as there is no contradiction. For example, in a method described in the present specification, elements of various steps are presented in an exemplary order. The order is not limited to the presented specific order.

The particular operations, that are supposed to be performed by the base station apparatus 10 in the present specification, may be performed by an upper node in some cases. In a network including one or more network nodes including the base station apparatus 10, it is apparent that various operations performed for communicating with the terminal 20 may be performed by the base station apparatus 10 and/or another network node other than the base station apparatus 10 (for example, but not limited to, MME or S-GW). According to the above, a case is described in which there is a single network node other than the base station apparatus 10. However, a combination of multiple other network nodes may be considered (e.g., MME and S-GW).

The information or signals described in this disclosure may be output from a higher layer (or lower layer) to a lower layer (or higher layer). The information or signals may be input or output through multiple network nodes.

The input or output information may be stored in a specific location (e.g., memory) or managed using management tables. The input or output information may be overwritten, updated, or added. The information that has been output may be deleted. The information that has been input may be transmitted to another apparatus.

A decision or a determination in an embodiment of the present invention may be realized by a value (0 or 1) represented by one bit, by a boolean value (true or false), or by comparison of numerical values (e.g., comparison with a predetermined value).

Software should be broadly interpreted to mean, whether referred to as software, firmware, middle-ware, microcode, hardware description language, or any other name, instructions, instruction sets, codes, code segments, program codes, programs, subprograms, software modules, applications, software applications, software packages, routines, subroutines, objects, executable files, executable threads, procedures, functions, and the like.

Further, software, instructions, information, and the like may be transmitted and received via a transmission medium. For example, in the case where software is transmitted from a website, server, or other remote source using at least one of wired line technologies (such as coaxial cable, fiber optic cable, twisted pair, digital subscriber line (DSL) and wireless technologies (infrared, microwave, etc.), at least one of these wired line technologies and wireless technologies is included within the definition of the transmission medium.

Information, a signal, or the like, described in the present specification may represented by using any one of various different technologies. For example, data, an instruction, a command, information, a signal, a bit, a symbol, a chip, or the like, described throughout the present application, may be represented by a voltage, an electric current, electromagnetic waves, magnetic fields, a magnetic particle, optical fields, a photon, or a combination thereof.

It should be noted that a term used in the present specification and/or a term required for understanding of the present specification may be replaced by a term having the same or similar meaning. For example, a channel and/or a symbol may be a signal (signaling). Further, a signal may be a message. Further, the component carrier (CC) may be referred to as a carrier frequency, cell, frequency carrier, or the like.

As used in the present disclosure, the terms "system" and "network" are used interchangeably.

Further, the information, parameters, and the like, described in the present disclosure may be expressed using absolute values, relative values from predetermined values, or they may be expressed using corresponding different information. For example, a radio resource may be what is indicated by an index.

The names used for the parameters described above are not used as limitations. Further, the mathematical equations using these parameters may differ from those explicitly disclosed in the present disclosure. Because the various channels (e.g., PUCCH, PDCCH) and information elements may be identified by any suitable names, the various names assigned to these various channels and information elements are not used as limitations.

In the present disclosure, the terms "BS: Base Station", "Radio Base Station", "Base Station Apparatus", "Fixed Station", "NodeB", "eNodeB (eNB)", "gNodeB (gNB)", "Access Point", "Transmission Point", "Reception Point", "Transmission/Reception Point", "Cell", "Sector", "Cell Group", "Carrier", "Component Carrier", and the like, may be used interchangeably. The base station may be referred to as a macro-cell, a small cell, a femtocell, a picocell and the like.

The base station may accommodate (provide) one or more (e.g., three) cells. In the case where the base station accommodates a plurality of cells, the entire coverage area of the base station may be divided into a plurality of smaller areas, each smaller area may provide communication services by means of a base station subsystem (e.g., an indoor small base station or a remote Radio Head (RRH)). The term "cell" or "sector" refers to a part or all of the coverage area of at least one of the base station and base station subsystem that provides communication services at the coverage.

In the present disclosure, terms such as "mobile station (MS)", "user terminal", "user equipment", and the like, may be used interchangeably.

There is a case in which the mobile station may be referred to, by a person skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

At least one of the base station and the mobile station may be referred to as a transmission apparatus, reception apparatus, communication apparatus, or the like. The at least one of the base station and the mobile station may be a device mounted on the mobile station, the mobile station itself, or the like. The mobile station may be a vehicle (e.g., a car, an airplane, etc.), an unmanned mobile body (e.g., a drone, an automated vehicle, etc.), or a robot (manned or unmanned). At least one of the base station and the mobile station may include an apparatus that does not necessarily move during communication operations. For example, at least one of the base station and the mobile station may be an IoT (Internet of Things) device such as a sensor.

Further, the base station in the present disclosure may be read as the terminal. For example, each aspect/embodiment of the present disclosure may be applied to a configuration in which communications between the base station and the terminal are replaced by communications between multiple terminals 20 (e.g., may be referred to as D2D (Device-to-Device), V2X (Vehicle-to-Everything), etc.). In this case, the function of the base station apparatus 10 described above may be provided by the terminal 20. Further, the phrases "up" and "down" may also be replaced by the phrases corresponding to terminal-to-terminal communication (e.g., "side"). For example, an uplink channel, a downlink channel, or the like, may be read as a sidelink channel.

Similarly, the terminal in the present disclosure may be read as the base station. In this case, the function of the terminal described above may be provided by the base station.

The term "determining" used in the present specification may include various actions or operations. The "determining" may include, for example, a case in which "judging", "calculating", "computing", "processing", "deriving", "investigating", "looking up, search, inquiry" (e.g., looking up a table, database, or other data structures), or "ascertaining" is deemed as "determining". Further, the "determining" may include a case in which "receiving" (e.g., receiving information), "transmitting" (e.g., transmitting information), "inputting", "outputting", or "accessing" (e.g., accessing data in a memory) is deemed as "determining". Further, the "determining" may include a case in which "resolving", "selecting", "choosing", "establishing", "comparing", or the like is deemed as "determining". In other words, the "determining" may include a case in which a certain action or operation is deemed as "determining". Further, "decision" may be read as "assuming," "expecting," or "considering," etc.

The term "connected" or "coupled" or any variation thereof means any direct or indirect connection or connection between two or more elements and may include the presence of one or more intermediate elements between the two elements "connected" or "coupled" with each other. The coupling or connection between the elements may be physical, logical, or a combination thereof. For example, "connection" may be read as "access". As used in the present disclosure, the two elements may be thought of as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS or may be referred to as a pilot, depending on the applied standards.

The description "based on" used in the present specification does not mean "based on only" unless otherwise specifically noted. In other words, the phrase "base on" means both "based on only" and "based on at least".

Any reference to an element using terms such as "first" or "second" as used in the present disclosure does not generally limit the amount or the order of those elements. These terms may be used in the present disclosure as a convenient way to distinguish between two or more elements. Therefore, references to the first and second elements do not imply that only two elements may be employed or that the first element must in some way precede the second element.

"Means" included in the configuration of each of the above apparatuses may be replaced by "parts", "circuits", "devices", etc.

In the case where the terms "include", "including" and variations thereof are used in the present disclosure, these terms are intended to be comprehensive in the same way as the term "comprising". Further, the term "or" used in the present specification is not intended to be an "exclusive or".

A radio frame may include one or more frames in the time domain. Each of the one or more frames in the time domain may be referred to as a subframe. The subframe may further include one or more slots in the time domain. The subframe may be a fixed length of time (e.g., 1 ms) independent from the numerology.

The numerology may be a communication parameter that is applied to at least one of the transmission and reception of a signal or channel. The numerology may indicate at least one of, for example, SubCarrier Spacing (SCS), bandwidth, symbol length, cyclic prefix length, transmission time interval (TTI), number of symbols per TTI, radio frame configuration, specific filtering processing performed by the transceiver in the frequency domain, and specific windowing processing performed by the transceiver in the time domain.

The slot may include one or more symbols in the time domain, such as OFDM (Orthogonal Frequency Division Multiplexing) symbols, SC-FDMA (Single Carrier Frequency Division Multiple Access) symbols, and the like. The slot may be a time unit based on the numerology.

The slot may include a plurality of mini slots. Each mini slot may include one or more symbols in the time domain. Further, the mini slot may be referred to as a sub-slot. The mini slot may include fewer symbols than the slot. PDSCH (or PUSCH) transmitted in time units greater than a mini slot may be referred to as PDSCH (or PUSCH) mapping type A. PDSCH (or PUSCH) transmitted using a mini slot may be referred to as PDSCH (or PUSCH) mapping type B.

A radio frame, a subframe, a slot, a mini slot and a symbol all represent time units for transmitting signals. Different terms may be used for referring to a radio frame, a subframe, a slot, a mini slot and a symbol, respectively.

For example, one subframe may be referred to as a transmission time interval (TTI), multiple consecutive subframes may be referred to as a TTI, and one slot or one mini slot may be referred to as a TTI. In other words, at least one of the subframe and the TTI may be a subframe (1 ms) in an existing LTE, a period shorter than 1 ms (e.g., 1-13 symbols), or a period longer than 1 ms. It should be noted that the unit representing the TTI may be referred to as a slot, a mini slot, or the like, rather than a subframe. Further, a slot may be referred to as a unit time. The unit time may vary for each cell depending on the numerology.

The TTI refers to, for example, the minimum time unit for scheduling in wireless communications. For example, in an LTE system, a base station schedules each terminal 20 to allocate radio resources (such as frequency bandwidth, transmission power, etc. that can be used in each terminal 20) in TTI units. The definition of TTI is not limited to the above.

The TTI may be a transmission time unit, such as a channel-encoded data packet (transport block), code block, codeword, or the like, or may be a processing unit, such as scheduling or link adaptation. It should be noted that, when a TTI is provided, the time interval (e.g., the number of symbols) during which the transport block, code block, codeword, or the like, is actually mapped may be shorter than the TTI.

It should be noted that, when one slot or one mini slot is referred to as a TTI, one or more TTIs (i.e., one or more slots or one or more mini slots) may be the minimum time unit for scheduling. Further, the number of slots (the number of mini slots) constituting the minimum time unit of the scheduling may be controlled.

A TTI having a time length of 1 ms may be referred to as a normal TTI (a TTI in LTE Rel. 8-12), a long TTI, a normal subframe, a long subframe, a slot, and the like. A TTI that is shorter than the normal TTI may be referred to as a shortened TTI, a short TTI, a partial TTI (or fractional TTI), a shortened subframe, a short subframe, a mini slot, a subslot, a slot, or the like.

It should be noted that the long TTI (e.g., normal TTI, subframe, etc.) may be replaced with a TTI having a time length exceeding 1 ms, and the short TTI (e.g., shortened TTI, etc.) may be replaced with a TTI having a TTI length less than the TTI length of the long TTI and a TTI length greater than 1 ms.

A resource block (RB) is a time domain and frequency domain resource allocation unit and may include one or more consecutive subcarriers in the frequency domain. The number of subcarriers included in a RB may be the same, regardless of the numerology, and may be 12, for example. The number of subcarriers included in an RB may be determined on the basis of numerology.

Further, the time domain of a RB may include one or more symbols, which may be 1 slot, 1 mini slot, 1 subframe, or 1 TTI in length. One TTI, one subframe, etc., may each include one or more resource blocks.

It should be noted that one or more RBs may be referred to as physical resource blocks (PRBs, Physical RBs), sub-carrier groups (SCGs), resource element groups (REGs), PRB pairs, RB pairs, and the like.

Further, a resource block may include one or more resource elements (RE). For example, 1 RE may be a radio resource area of one sub-carrier and one symbol.

The bandwidth part (BWP) (which may also be referred to as a partial bandwidth, etc.) may represent a subset of consecutive common RBs (common resource blocks) for a given numerology in a carrier. Here, a common RB may be identified by an index of RB relative to the common reference point of the carrier. A PRB may be defined in a BWP and may be numbered within the BWP.

BWP may include BWP for UL (UL BWP) and BWP for DL (DL BWP). For a UE, one or more BWPs may be configured in one carrier.

At least one of the configured BWPs may be activated, and the UE may assume that the UE will not transmit and receive signals/channels outside the activated BWP. It should be noted that the terms "cell" and "carrier" in this disclosure may be replaced by "BWP."

Structures of a radio frame, a subframe, a slot, a mini slot, and a symbol described above are exemplary only. For example, the number of subframes included in a radio frame, the number of slots per subframe or radio frame, the number of mini slots included in a slot, the number of symbols and RBs included in a slot or mini slot, the number of subcarriers included in an RB, the number of symbols in a TTI, the symbol length, the cyclic prefix (CP) length, and the like, may be changed in various ways.

In the present disclosure, where an article is added by translation, for example "a", "an", and "the", the disclosure may include that the noun following these articles is plural.

In this disclosure, the term "A and B are different" may mean "A and B are different from each other." It should be noted that the term "A and B are different" may mean "A and B are different from C." Terms such as "separated" or "combined" may be interpreted in the same way as the above-described "different".

An aspect/embodiment described in the present specification may be used independently, may be used in combination, or may be used by switching according to operations. Further, notification (transmission/reporting) of predetermined information (e.g., notification (transmission/reporting) of "X") is not limited to an explicit notification (transmission/reporting), and may be performed by an implicit notification (transmission/reporting) (e.g., by not performing notification (transmission/reporting) of the predetermined information).

As described above, the present invention has been described in detail. It is apparent to a person skilled in the art that the present invention is not limited to one or more embodiments of the present invention described in the present specification. Modifications, alternatives, replacements, etc., of the present invention may be possible without departing from the subject matter and the scope of the present invention defined by the descriptions of claims. Therefore, the descriptions of the present specification are for illustrative purposes only, and are not intended to be limitations to the present invention. Now that the PUCCH resource is an example of resource information for uplink transmission.

DESCRIPTION OF THE REFERENCE NUMERALS

10 Base station apparatus
110 Transmission unit
120 Reception unit
130 Setting unit
140 Control unit
20 Terminal
210 Transmission unit
220 Reception unit
230 Setting unit
240 Control unit
1001 Processor
1002 Storage device
1003 Auxiliary storage device
1004 Communication device
1005 Input device
1006 Output device

What is claimed is:

1. A terminal comprising:
a receiver configured to receive a Media Access Control (MAC) Control Element (CE) and a spatial relation information identifier associated with a Physical Uplink Control Channel (PUCCH) resource; and
a processor configured to activate or deactivate a spatial relation of the PUCCH resource, based on the MAC CE received by the receiver,
wherein the MAC CE includes a serving cell ID, a BandWidth Part (BWP) ID, and a PUCCH resource ID for identifying a PUCCH group to which the PUCCH resource belongs, and the PUCCH resource,
wherein the MAC CE applies to all PUCCH resources that belong to the PUCCH group, and
wherein the spatial relation information identifier indicates a spatial setting for PUCCH transmission associated with the PUCCH resource, and the spatial setting specifies a spatial domain filter for PUCCH transmission based on a reference signal.

2. A communication method executed by a terminal, the communication method comprising:
receiving a Media Access Control (MAC) Control Element (CE) and a spatial relation information identifier associated with a Physical Uplink Control Channel (PUCCH) resource; and
activating or deactivating a spatial relation of the PUCCH resource, based on the received MAC CE,
wherein the MAC CE includes a serving cell ID, a BandWidth Part (BWP) ID, and a PUCCH resource ID for identifying a PUCCH group to which the PUCCH resource belongs, and the PUCCH resource,
wherein the MAC CE applies to all PUCCH resources that belong to the PUCCH group, and
wherein the spatial relation information identifier indicates a spatial setting for PUCCH transmission associated with the PUCCH resource, and the spatial setting specifies a spatial domain filter for PUCCH transmission based on a reference signal.

3. A base station comprising:
a processor configured to generate a Media Access Control (MAC) Control Element (CE), the MAC CE including a serving cell ID, a BandWidth Part (BWP) ID, a Physical Uplink Control Channel (PUCCH) resource ID for identifying a PUCCH group to which a PUCCH resource belongs, and the PUCCH resource, and a spatial relation information identifier associated with the PUCCH resource; and
a transmitter configured to transmit the MAC CE to activate or deactivate a spatial relation of the PUCCH resource and the spatial relation information identifier,
wherein the MAC CE applies to all PUCCH resources that belong to the PUCCH group, and
wherein the spatial relation information identifier indicates a spatial setting for PUCCH transmission associated with the PUCCH resource, and the spatial setting specifies a spatial domain filter for PUCCH transmission based on a reference signal.

4. A system comprising: a terminal; and a base station, wherein
the base station includes
a first processor configured to generate a Media Access Control (MAC) Control Element (CE), the MAC CE including a serving cell ID, a BandWidth Part (BWP) ID, a Physical Uplink Control Channel (PUCCH) resource ID for identifying a PUCCH group to which a PUCCH resource belongs, and the PUCCH resource, and a spatial relation information identifier associated with the PUCCH resource; and
a transmitter configured to transmit the MAC CE to activate or deactivate a spatial relation of the PUCCH resource and the spatial relation information identifier, and
the terminal includes
a receiver configured to receive the MAC CE and the spatial relation information identifier, and
a second processor configured to activate or deactivate a spatial relation of the PUCCH resource, based on the MAC CE received by the receiver,
wherein the MAC CE applies to all PUCCH resources that belong to the PUCCH group, and
wherein the spatial relation information identifier indicates a spatial setting for PUCCH transmission associated with the PUCCH resource, and the spatial setting specifies a spatial domain filter for PUCCH transmission based on a reference signal.

* * * * *